(12) United States Patent
Roberts et al.

(10) Patent No.: US 11,693,593 B2
(45) Date of Patent: Jul. 4, 2023

(54) VERSIONING DATA STORED ON MEMORY DEVICE

(71) Applicant: Micron Technology, Inc., Boise, ID (US)

(72) Inventors: David Andrew Roberts, Wellesley, MA (US); Sean Stephen Eilert, Penryn, CA (US)

(73) Assignee: Micron Technology, Inc., Boise, ID (US)

(*) Notice: Subject to any disclaimer, the term of this patent is extended or adjusted under 35 U.S.C. 154(b) by 223 days.

(21) Appl. No.: 17/082,947

(22) Filed: Oct. 28, 2020

(65) Prior Publication Data

US 2022/0129196 A1    Apr. 28, 2022

(51) Int. Cl.
*G06F 3/06* (2006.01)
*G06F 12/06* (2006.01)

(52) U.S. Cl.
CPC .......... *G06F 3/0659* (2013.01); *G06F 3/065* (2013.01); *G06F 3/0619* (2013.01); *G06F 3/0656* (2013.01); *G06F 3/0673* (2013.01); *G06F 12/06* (2013.01); *G06F 2212/1008* (2013.01)

(58) Field of Classification Search
CPC ........ G06F 3/065; G06F 12/06; G06F 3/0619; G06F 3/0656; G06F 3/0673; G06F 3/0659
USPC ...... 711/103, 12.008, 102, 12.001, 104, 162, 711/12.021, 100
See application file for complete search history.

(56) References Cited

U.S. PATENT DOCUMENTS

| 8,516,021 | B2 * | 8/2013 | Aronovich ............ G06F 16/182 707/826 |
| 2011/0302136 | A1 | 12/2011 | Lakshminath et al. |
| 2012/0158680 | A1 | 6/2012 | Shaughnessy |

(Continued)

FOREIGN PATENT DOCUMENTS

| KR | 20180030319 | 3/2018 |
| KR | 20190113359 A | 10/2019 |
| WO | 2022093961 | 5/2022 |

OTHER PUBLICATIONS

Chou, Chiachen, "CAMEO:A Two-Level Memory Organization with Capacity of Main Memory and Flexibility of Hardware-Managed Cache", 2014 47th Annual IEEE ACM International Symposium on Microarchitecture, (2014), 12 pgs.

Dong, X, "Leveraging 3D PCRAM technologies to reduce checkpoint overhead for future exascale systems", Proceedings of the Conference on High Performance Computing Networking, Storage and Analysis, (2009), 13 pgs.

(Continued)

*Primary Examiner* — Gautam Sain
*Assistant Examiner* — Edward Waddy, Jr.
(74) *Attorney, Agent, or Firm* — Schwegman Lundberg & Woessner, P.A.

(57) ABSTRACT

Various embodiments enable versioning of data stored on a memory device, where the versioning allows the memory device to maintain different versions of data within a set of physical memory locations (e.g., a row) of the memory device. In particular, some embodiments provide for a memory device or a memory sub-system that uses versioning of stored data to facilitate a rollback operation/behavior, a checkpoint operation/behavior, or both. Additionally, some embodiments provide for a transactional memory device or a transactional memory sub-system that uses versioning of stored data to enable rollback of a memory transaction, commitment of a memory transaction, or handling of a read or write command associated with respect to a memory transaction.

20 Claims, 17 Drawing Sheets

(56) References Cited

U.S. PATENT DOCUMENTS

| | | | |
|---|---|---|---|
| 2013/0138892 A1* | 5/2013 | Loh | G06F 12/123 |
| | | | 711/134 |
| 2014/0082322 A1* | 3/2014 | Loh | G06F 12/00 |
| | | | 711/E12.001 |
| 2014/0258660 A1 | 9/2014 | Cheriton | |
| 2016/0077922 A1 | 3/2016 | Yoon et al. | |
| 2016/0085585 A1* | 3/2016 | Chen | G06F 12/08 |
| | | | 711/205 |
| 2016/0147786 A1 | 5/2016 | Andrei et al. | |
| 2016/0328153 A1 | 11/2016 | Krause | |
| 2017/0185294 A1* | 6/2017 | Moon | G06F 3/0658 |
| 2018/0074748 A1 | 3/2018 | Makin et al. | |
| 2018/0253468 A1* | 9/2018 | Gurajada | G06F 16/2255 |
| 2019/0205244 A1* | 7/2019 | Smith | G06F 3/065 |
| 2020/0026698 A1 | 1/2020 | Benke et al. | |

OTHER PUBLICATIONS

Leis, V, "Exploiting hardware transactional memory in main-memory databases", IEEE 30th International Conference on Data Engineering, (2014), 12 pgs.

Seshadri, Vivek, "RowClone: Fast and Energy-Efficient In-DRAM Bulk Data Copy and Initialization", 2013 46th Annual IEEE ACM International Symposium on Microarchitecture (MICRO), (2013), 13 pgs.

"International Application Serial No. PCT US2021 056855, International Search Report dated Feb. 10, 2022", 3 pgs.

"International Application Serial No. PCT US2021 056855, Written Opinion dated Feb. 10, 2022", 5 pgs.

"International Application Serial No. PCT/US2022/032812, International Search Report dated Sep. 23, 2022", 3 pgs.

"International Application Serial No. PCT/US2022/032812, Written Opinion dated Sep. 23, 2022", 4 pgs.

* cited by examiner

300

302 RECEIVE MEMORY COMMAND ASSOCIATED WITH MEMORY ADDRESS, MEMORY ADDRESS MAPPING TO SET OF PHYSICAL MEMORY LOCATIONS OF MEMORY DEVICE, MEMORY DEVICE COMPRISING ROW BUFFER TO STORE PLURALITY OF DATA UNITS

RESPONSIVE TO RECEIVING MEMORY COMMAND

304 PERFORM DATA VERSIONING OPERATION ON SET OF PHYSICAL MEMORY LOCATIONS USING ROW BUFFER AND AT LEAST ONE OF SELECTION DATA OR ROLLBACK DATA

┌─────────────────────────────────┐
│ RECEIVE MEMORY COMMAND          │
│ ASSOCIATED WITH MEMORY ADDRESS, │
│ MEMORY ADDRESS MAPPING TO SET OF│ 602
│ PHYSICAL MEMORY LOCATIONS OF    │
│ MEMORY DEVICE, MEMORY DEVICE    │
│ COMPRISING ROW BUFFER TO STORE  │
│ PLURALITY OF DATA UNITS         │
└─────────────────────────────────┘
              │ RESPONSIVE TO RECEIVING
              │ MEMORY COMMAND
              ▼
┌─────────────────────────────────┐
│ PERFORM DATA VERSIONING         │
│ OPERATION ON SET OF PHYSICAL    │ 604
│ MEMORY LOCATIONS USING ROW      │
│ BUFFER AND AT LEAST ONE OF      │
│ SELECTION DATA OR ROLLBACK DATA │
└─────────────────────────────────┘
              │
              ▼
┌─────────────────────────────────┐
│ PERFORMING REFRESH OPERATION ON │
│ SET OF PHYSICAL MEMORY LOCATIONS,│ 606
│ REFRESH OPERATION COMPRISING    │
│ PERFORMING CHECKPOINT OPERATION │
│ ON SET OF PHYSICAL MEMORY       │
│ LOCATIONS                       │
└─────────────────────────────────┘

702 RECEIVE MEMORY COMMAND TO WRITE HOST DATA TO MEMORY ADDRESS, MEMORY ADDRESS MAPPING TO SET OF PHYSICAL MEMORY LOCATIONS OF MEMORY DEVICE, MEMORY DEVICE COMPRISING ROW BUFFER TO STORE PLURALITY OF DATA UNITS

RESPONSIVE TO RECEIVING MEMORY COMMAND

704 READ CURRENT ROLLBACK VALUE OF ROLLBACK DATA ASSOCIATED WITH SET OF PHYSICAL MEMORY LOCATIONS

706 DETERMINE, BASED ON CURRENT ROLLBACK VALUE, WHETHER CURRENTLY-SELECTED DATA UNIT OF PLURALITY OF DATA UNITS IS DIRTY, CURRENTLY-SELECTED DATA UNIT BEING IDENTIFIED BY SELECTION DATA

708 WRITE HOST DATA TO ROW BUFFER BASED ON DETERMINING WHETHER CURRENTLY-SELECTED DATA UNIT IS DIRTY

*FIG. 7*

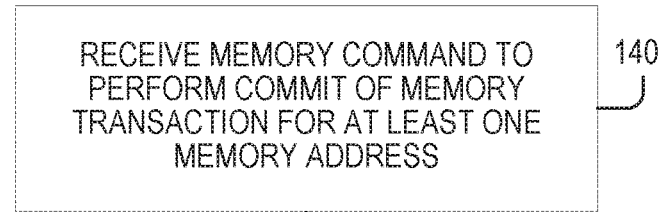
FIG. 14

VERSIONING DATA STORED ON MEMORY DEVICE

TECHNICAL FIELD

Embodiments of the disclosure relate generally to memory devices and, more specifically, to versioning data stored on a memory device, which can be part of a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIGS. 3 through 15 are flow diagrams of example methods for using versioning of stored data on a memory device, in accordance with some embodiments of the present disclosure.

DETAILED DESCRIPTION

Figure 1:
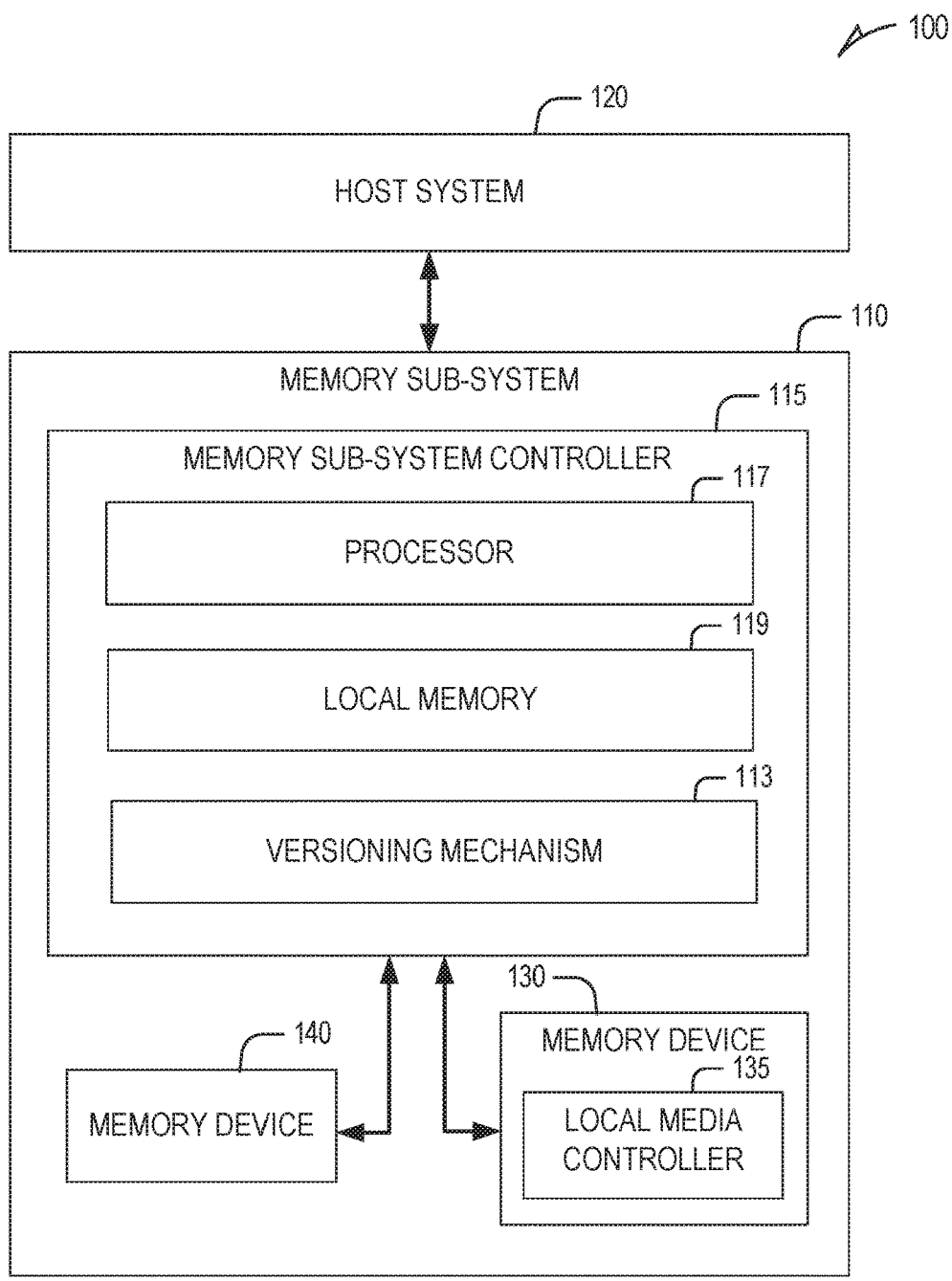
FIG. 1 is a block diagram illustrating an example computing system that includes a memory sub-system, in accordance with some embodiments of the present disclosure.

Aspects of the present disclosure are directed to versioning data stored on a memory device, which can be part of a memory sub-system, where the versioning can enable the memory device to maintain different versions of data within a set of physical memory locations (e.g., a row) of the memory device, which can facilitate checkpoint and rollback operations on the memory device or rollback or commitment of a memory transaction. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can send access requests to the memory sub-system, such as to store data at the memory sub-system and to read data from the memory sub-system.

The host system can send access requests (e.g., write command, read command) to the memory sub-system, such as to store data on a memory device at the memory sub-system, read data from the memory device on the memory sub-system, or write/read constructs (e.g., such as submission and completion queues) with respect to a memory device on the memory sub-system. The data to be read or written, as specified by a host request, is hereinafter referred to as "host data." A host request can include logical address information (e.g., logical block address (LBA), namespace) for the host data, which is the location the host system associates with the host data. The logical address information (e.g., LBA, namespace) can be part of metadata for the host data. Metadata can also include error handling data (e.g., error-correcting code (ECC) codeword, parity code), data version (e.g., used to distinguish age of data written), valid bitmap (which LBAs or logical transfer units contain valid data), and so forth.

The memory sub-system can initiate media management operations, such as a write operation, on host data that is stored on a memory device. For example, firmware of the memory sub-system may re-write previously written host data from a location of a memory device to a new location as part of garbage collection management operations. The data that is re-written, for example as initiated by the firmware, is hereinafter referred to as "garbage collection data."

"User data" hereinafter generally refers to host data and garbage collection data. "System data" hereinafter refers to data that is created and/or maintained by the memory sub-system for performing operations in response to host requests and for media management. Examples of system data include, and are not limited to, system tables (e.g., logical-to-physical memory address mapping table (also referred to herein as a L2P table), data from logging, scratch pad data, and so forth).

A memory device can be a non-volatile memory device. A non-volatile memory device is a package of one or more die. Each die can be comprised of one or more planes. For some types of non-volatile memory devices (e.g., negative-and (NAND)-type devices), each plane is comprised of a set of physical blocks. For some memory devices, blocks are the smallest area that can be erased. Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which are a raw memory device combined with a local embedded controller for memory management within the same memory device package.

A traditional computer system, such as a conventional supercomputer, can use memory checkpointing, where data content of volatile main memory (e.g., dynamic random access memory (DRAM) device) is periodically saved to persistent data storage (e.g., magnetic disk data storage or solid-state data storage) so that at least some portion of the computational state can be restored for the computer systems in the event of a hardware or software error. Similarly, for conventional transactional memory systems, a failed memory transaction results in data in memory to roll back to the contents of a prior checkpoint or memory transaction commit.

However, conventional methodologies for memory checkpointing and rollback can involve data movements (e.g., between a host system and a memory sub-system) that are time consuming and energy consuming. Conventional transactional memory systems usually handle memory command conflicts (e.g., write command conflicts) at a host system (e.g., at the cache level of the host system, such as with respect to CPU cache level), which results in data being copied between the host system and a memory device/ memory sub-system. Additionally, for conventional transactional memory systems, transactional memory dirty data is usually limited to the cache capacity (e.g., capacity of the level-1 (L1) cache) of the host system.

Aspects of the present disclosure address the above and other deficiencies by versioning data stored on a memory device. In particular, various embodiments enable versioning of data stored on a memory device, where the versioning allows the memory device to maintain different versions of data within a set of physical memory locations (e.g., a row) of the memory device. Some embodiments provide for a memory device or a memory sub-system that uses versioning of stored data to facilitate a rollback operation/behavior, a checkpoint operation/behavior, or both. For instance, use of some embodiments enable a memory device or a memory sub-system, such as a non-volatile main memory (e.g., NVDIMM), to perform lightweight in-place data checkpointing and rollback within the memory device. Additionally, some embodiments provide for a transactional memory device or a transactional memory sub-system that uses versioning of stored data to enable rollback of a memory transaction (e.g., roll back a failed memory transaction), commitment (e.g., checkpoint) of a memory transaction, or handling of a read or write command associated with respect to a memory transaction (e.g., detect and resolve a conflict caused by a write command).

According to some embodiments, a set of physical memory locations (e.g., a row) of the memory device has associated selection data (e.g., selection bit) and rollback data (e.g., rollback bit), which enable the set of physical memory locations to store a plurality of data units (e.g., cache lines of data, also referred to as cache lines) of data in association with a memory address that maps to the set of physical memory locations. Each of those data units can store a different version of data in association with the memory address, which can enable a checkpoint and a rollback operation to be performed on the memory address on the memory device. A row buffer of the memory device is configured to store a plurality of data units (e.g., multiple cache lines of data) of data accessed for (e.g., read from or written to) individual sets of physical memory locations (e.g., individual rows). For instance, a row buffer of a memory device can be configured to store 128 bytes of data read from or written to a row of the memory device, where the 128 bytes of data comprise two 64-byte cache lines of data. Depending on the embodiment, a row buffer can be configured to store more than two cache lines of data for a set of physical memory locations (e.g., row) of a memory device, and the set of physical memory locations can comprise physical memory locations from a same row, bank, or memory chip of the memory device.

For some embodiments, selection data associated with an individual set of physical memory locations (e.g., individual row) identifies which one of a plurality of data units for the individual set (e.g., which one of the cache lines of data) is a currently-selected data unit (e.g., data unit selected as a checkpoint by a last checkpoint operation, and is currently being read from or written to). Additionally, for some embodiments, rollback data associated with an individual set of physical memory locations (e.g., individual row) indicates whether a data unit currently identified by the selection data is dirty (e.g., inaccurate, incomplete, inconsistent, or uncommitted); a dirty indication can represent that the data units have been written to since the last time a checkpoint was performed on the individual set of physical memory locations (or memory transaction commit has been performed). For example, an independent set of physical memory locations can comprise a row of a memory device, a plurality of data units can comprise a plurality of cache lines of data, selection data associated with the row can comprise a selection bit that identifies (e.g., by a value of 0 or 1) a first cache line of data or a second cache line of data of a pair of cache lines (e.g., pair of 64-byte cache lines), and rollback data associated with the row can comprise a rollback bit that indicates (e.g., by a value of 0 or 1) whether the cache line identified by the selection bit is dirty or written to since last checkpoint.

In various embodiments, for a transactional memory device or a transactional memory sub-system, a memory command received from a host system comprises a requester identifier (e.g., writer identifier included by a write memory command) that can be used, in combination with at least one of rollback data or selection data, to handle processing of a memory command associated with a memory transaction, which can include handling one or more conflict errors.

By use of various embodiments, checkpointing and rolling back data, or committing or rolling back memory transactions, can be performed on a memory device or a memory sub-system, and can be performed with external data copying and associated time and energy consumed by such copying. Accordingly, some embodiments can minimize data movement, and save time and energy consumed by checkpoint and rollback operations/behavior on a memory device. With respect to transactional memory, using a versioning mechanism of an embodiment can enable a memory device or a memory sub-system to detect and handle memory command conflicts (e.g., write memory command conflicts) for a given memory transaction. In this way, a memory device of various embodiments can obviate the need for use of a host system to handle and resolve conflicts. Additionally, in this way, performance of conflict resolution of memory commands can be moved from the host system to a memory device/memory sub-system, thereby overcoming a host system's cache capacity limit (e.g., L1 cache limit) for conventional transactional memory systems.

For some embodiments, the rollback bit is used with other operations performed on a set of physical memory locations (e.g., row) of a memory device. For instance, an operation configured to clone data from a source set of physical memory locations (e.g., first row), associated with a source memory address, to a destination set of physical memory locations (e.g., second row) associated with a destination memory address. Such an operation (e.g., row clone operation) can enable bulk copy of data within a memory device. Depending on the embodiment, a clone operation can include logic (e.g., in a sub-array row buffer) that checks the rollback data associated with a source set of the physical memory locations, write to the destination set of physical memory locations in response to the rollback data indicating that the currently-selected data unit (of the source set of the physical memory locations) is dirty (e.g., rollback bit is set to true or 1), and not write to the destination set of physical memory locations in response to the rollback data indicating that the currently-selected data unit is not dirty.

As used herein, a set of physical memory locations can comprise a row or a page (e.g., of a NAND-type memory device) of a memory device. The set of physical memory locations can be associated with a memory address that maps to the set of physical memory locations. A row of data can be composed of a single physical row (e.g., a physical row of DRAM device or NAND-type memory device), or a logical row composed from different portions of the memory device (e.g., different banks, planes, dies, etc. of the memory device). As used herein, a row buffer comprises a buffer that is used to read data from, or write data to, a set of physical memory locations of a memory device, where the set of physical memory locations can be a row or a page of data from of the memory device. The row buffer can store a plurality of data units of data, such as multiple cache lines of data, read from or written to an individual set of physical memory locations (e.g., an individual row) of the memory device. As used herein, a data unit can comprise a unit of data, such as a cache line of data.

As used herein, a data versioning operation can generally refer to either a rollback operation or a checkpoint operation. As used herein, a checkpoint operation can generate (e.g., create) a checkpoint for a memory address, where the checkpoint identifies which data unit (e.g., cache line), of a plurality of data units (e.g., plurality of cache lines) associated with the memory address, is considered a data restoration point for data associated with (e.g., accessed via) the memory address. As also used herein, a rollback operation performed on a memory address can roll back (e.g., checkpoint recover) data currently associated with (e.g., accessed via) a memory address to a checkpoint generated for the memory address, where the data is restored to a data unit, of a plurality of data units (e.g., plurality of cache lines) associated with the memory address, identified by the checkpoint. Depending on the embodiment, a checkpoint operation, a rollback operation, or both can be performed on multiple sets of physical memory locations (e.g., multiple rows) in parallel. After performing a checkpoint operation on a memory address, a previously speculative memory state (e.g., dirty state) of a currently-selected data unit (currently identified by selection data associated with the set of physical memory locations) can be set to an active state (e.g., non-dirty state). After performing a rollback operation on a memory address, if data in a data unit (currently identified by selection data associated with the set of physical memory locations) has been modified since the last checkpoint operation (as indicated by the rollback data), this modified version of data can be effectively dropped and the state of data currently associated with the memory address can effectively revert to a previous version of data stored in another data unit (of the plurality of data units) associated with the memory address.

Though various embodiments are described herein with respect to a memory sub-system controller, some embodiments implement features described herein (e.g., operations for rollback, checkpoint, row cloning with rollback/checkpoint) as part of a memory device (e.g., a controller, processor, or state machine of a memory die). For instance, various embodiments implement versioning operations as part of a controller, processor, or state machine for each bank within a memory device.

Disclosed herein are some examples of versioning data stored on a memory device, as described herein.

FIG. 1 illustrates an example computing system 100 that includes a memory sub-system 110, in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, a secure digital (SD) card, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., a peripheral component interconnect express (PCIe) controller, serial advanced technology attachment (SATA) controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a SATA interface, a peripheral component interconnect express (PCIe) interface, universal serial bus (USB) interface. Fibre Channel, Serial Attached SCSI (SAS). Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, SLCs, can store one bit per cell. Other types of memory cells, such as multi-level cells (MLCs), TLCs, quad-level cells (QLCs), and penta-level cells (PLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide-based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide-based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, and so forth. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical memory address (e.g., physical block address) that are associated with the memory devices 130. The memory sub-system controller 115 can further include host interface circuitry to communicate with the host system 120 via the physical host interface. The host interface circuitry can convert the commands received from the host system 120 into command instructions to access the memory devices 130 and/or the memory device 140 as well as convert responses associated with the memory devices 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 135) for media management within the same memory device package. An example of a managed memory device is a managed NAND (MNAND) device.

The memory sub-system controller 115 includes a versioning mechanism 113 that enables or facilitates versioning of data stored on one of the memory devices 130, 140 (e.g., maintaining versions of data stored on individual rows of the memory devices 130, 140). For some embodiments, the versioning mechanism 113 enables the memory sub-system 110 to maintain different versions of data for different sets of physical memory locations (e.g., different rows) of one of the memory devices 130, 140. The versioning mechanism 113 can enable the memory sub-system 110 (via the memory sub-system controller 115) to use versioning stored data to facilitate a rollback operation/behavior, a checkpoint operation/behavior, or both as described herein with respect to an individual set of physical memory locations (e.g., row) of one of the memory devices 130, 140. Where the memory sub-system 110 implements a transactional memory functionality or features, the versioning mechanism 113 can enable the memory sub-system 110 (via the memory sub-system controller 115) to use versioning stored data to facilitate rollback of a memory transaction (e.g., rollback a failed memory transaction), commit (e.g., checkpoint) of a memory transaction, or handling of a read or write command associated with respect to a memory transaction (e.g., detect and resolve a conflict caused by a write command) as described herein.

By the versioning mechanism 113, one of the memory devices 130, 140, each set of physical memory locations (e.g., each row) of the memory device (e.g., 130, 140) can have associated selection data (e.g., selection bit) and rollback data (e.g., rollback bit), and a row buffer of the memory device (e.g., 130, 140) is configured to store a plurality of data units (e.g., multiple cache lines) of data accessed for (e.g., read from or written to) individual sets of physical memory locations (e.g., individual rows). As described herein, a row buffer of one of the memory devices 130, 140 can be configured to store 128 bytes of data read from, or written to, a row of the memory device (e.g., 130, 140), where the 128 bytes of data comprise two 64-byte cache lines of data, with each capable of storing a different version of data in association with a given memory address. Depending on the embodiment, a row buffer of the memory device (e.g., 130, 140) can be configured to store more than two cache lines for a set of physical memory locations (e.g., row) of a memory device. Additionally, depending on the embodiment, the set of physical memory locations can comprise physical memory locations from a same row, bank, or memory chip of the memory device.

For some embodiments, the number of data units per set of physical memory locations (e.g., per row) is configurable, the size of each data unit is configurable, or both. For instance, a row buffer can store up to 128 bytes, each cache line stored by the row buffer can have a size of less than 64 bytes (e.g., 32 bytes each). Alternatively, two 64-byte cache lines are stored in two separate 64-byte buffers (e.g., in the same bank or two different banks of a memory device). Additionally, for some embodiments, the row buffer stores more than two data units (e.g., more than two cache lines). For example, for a row buffer that can store up to 128 bytes, the row buffer can store four 32-byte cache lines, with each capable of storing a different version of data in association with a given memory address. The versioning mechanism 113 can facilitate configuration of the number of data units, the size of each data unit, or both.

For some embodiments, the versioning mechanism 113 uses selection data associated with an individual set of physical memory locations (e.g., individual row) of one of the memory devices 130, 140, where the selection data identifies one data unit, of a plurality of data units for the individual set of physical memory locations (e.g., which one of the cache lines being read from or written to the individual row), as a currently-selected data unit. According to various embodiments, for an individual set of physical memory locations (e.g., individual row), the currently-selected data unit (identified by selection data) stores a version of data stored by the individual set of physical memory locations (e.g., individual row) that is currently selected for read or write operations. The currently-selected data unit (identified by the selection data) can represent a data unit currently selected to be a checkpoint by a last checkpoint operation. Additionally, for some embodiments, the versioning mechanism 113 uses rollback data associated with an individual set of physical memory locations (e.g., individual row) of one of the memory devices 130, 140, where the rollback data indicates whether a data unit currently identified by the selection data is dirty (e.g., inaccurate, incomplete, inconsistent, or uncommitted); a dirty indication can represent that the data units have been written to since the last time a checkpoint was performed on the individual set of physical memory locations (or memory transaction commit has been performed). For instance, an independent set of physical memory locations can comprise a row of a memory device, a plurality of data units can comprise a plurality of cache lines, selection data associated with the row can comprise a selection bit that identifies (e.g., by a value of 0 or 1) one or the other cache line of the plurality of cache lines (e.g., one of the 64-byte cache lines), and rollback data associated with the row can comprise a rollback bit that indicates (e.g., by a value of 0 or 1) whether the cache line identified by the selection bit is dirty or written to since the last checkpoint. An example of this is illustrated and described herein with respect to FIG. 2.

Depending on the embodiment, selection data (e.g., selection bit), rollback data (e.g., rollback bit), or both for a set of physical memory locations (e.g., a row) can be saved as metadata (e.g., metadata bits) associated with the set of physical memory locations. For instance, this metadata can be stored on the set of physical memory locations (e.g., row) of the memory device (e.g., 130, 140) with (e.g., in-line with) the plurality of data units stored on the set of physical memory locations. For example, within a given row of the memory device (e.g., 130, 140), the metadata comprising selection data and rollback data can be stored in a first position (e.g., position zero) with a first data unit (e.g., first cache line), which can permit the metadata read from a row buffer concurrently with the first data unit. For some embodiments, storing metadata in this way can enable the versioning mechanism 113 to implement a serialization optimization feature, where the row buffer can be accessed serially, with the first data unit, the selection data, and the rollback data stored at the first position of the row buffer being accessed (e.g., read) first. Subsequently, where the selection data (accessed from the first position) indicates that the first data unit is not identified as the currently-selected data unit (e.g., not identified as the currently-selected cache line), a second data unit (e.g., second cache line) at a second position (e.g., position one) of the row buffer can be accessed (e.g., read) or another data unit read from another position (e.g., higher position) of the row buffer. However, where the selection data (accessed from the first position) indicates that the first data unit is identified as the currently-selected data unit (e.g., identified as the currently-selected cache line), accessing the second data unit can be avoided, thereby reduce the amount of serial access performed. The serialization optimization can be facilitated by a process that maintains a dirty data unit (e.g., dirty cache line) at the first position, which can increase the likelihood of the data unit in the first position storing the data unit having the most current data for read or write access (e.g., common case that the data unit of location A is more likely to store dirty data on first access). The process that maintains the dirty data unit at the first position can be performed by the memory sub-system controller 115 periodically, such as during a refresh cycle or during idle periods of the memory sub-system 110. The process can comprise swapping the current data unit (e.g., current cache line) at the first position with a dirty data unit (e.g., dirty cache line) corresponding to another position (e.g., the second position), and adjusting the selection data to reflect the swap if necessary (e.g., if selection bit is currently set, the selection bit is inverted). The swap can comprise copying the dirty data unit to the first position, and copying the non-dirty data unit to another position (e.g., the second position). The process can be performed as part of a checkpoint operation. For some embodiments, the serialization optimization can reduce the amount of times the selection data and the rollback data are checked for each read or write access, which can reduce average access latency.

As an in addition to the swapping/copying of a dirty data unit to the first position for serialization optimization, some embodiments can avoid the swap/copy using a predictor, such as a line location predictor, to determine whether the swap/copy should be performed. The predictor (e.g., line location predictor) can be configured to predict whether the dirty data unit is more likely to be requested for access, can cause a swap/copy of the dirty data unit to the first position in response to predicting that the dirty data unit is more likely to be requested for access, and can avoid the swap/copy in response to predicting that the dirty data unit is not more likely to be requested for access. Such a predictor can mitigate serialization time and avoid the time and energy associated with performing a swap/copy.

For some embodiments, the versioning mechanism 113 implements the versioning of stored data described herein by way of memory address mapping (e.g., decoding) performed by the memory sub-system controller 115. According to some embodiments, the memory sub-system controller 115 maps (e.g., decodes) a single memory address to a single set of physical memory locations (e.g., a single row), where the single memory address addresses a single data unit (e.g., single cache line) of the plurality of data units (e.g., multiple cache lines) stored by the single set of physical memory locations. For instance, a memory address can map to an individual row of one of the memory devices 130, 140, where the individual row stores a plurality of cache lines, where a read memory command performed with respect to the memory address will read from only one of the cache lines of the plurality, and where a write memory command performed with respect to the memory address will write to only one of the cache lines of the plurality.

The versioning mechanism 113 enables the memory sub-system controller 115 to perform a checkpoint operation on one or more memory addresses on the memory sub-system 110, and to perform a rollback operation on one or more memory addresses on the memory sub-system 110. For some embodiments, the memory sub-system controller 115 performs a checkpoint operation in response to a memory command, such as a checkpoint memory command, received from the host system 120. Additionally, for some embodiments, the memory sub-system controller 115 performs a rollback operation in response to a memory command, such as a rollback memory command, received from the host system 120. A checkpoint operation, a rollback operation, or both can be performed on a single memory address that maps to an individual set of physical memory locations (e.g., row) or on a range of consecutive memory addresses that maps to multiple sets of physical memory locations (e.g., multiple rows). For some embodiments, the versioning mechanism 113 enables the memory sub-system controller 115 to perform a checkpoint operation on one or more memory addresses as part of a refresh operation (e.g., DRAM refresh operation) being performed (e.g., periodically) on those memory addresses.

A checkpoint memory command (from the host system 120) that causes the memory sub-system controller 115 to perform a checkpoint operation can comprise a memory command encoded as a bus command, which can have one or more memory addresses (e.g., a range of memory addresses) specified. Alternatively, the checkpoint operation can be invoked by the host system 120 by way of a register of the memory sub-system 110 (e.g., an external register, such as a CSR), and include communicating one or more memory addresses (e.g., a range of memory addresses) specified via one or more registers of the memory sub-system 110. Similarly, a rollback memory command (from the host system 120) that causes the memory sub-system controller 115 to perform a rollback operation can comprise a memory command encoded as a bus command, which can have one or more memory addresses (e.g., a range of memory addresses) specified. Alternatively, the rollback operation can be invoked by the host system 120 by way of a register of the memory sub-system 110 (e.g., an external register, such as a CSR), and include communicating one or more memory addresses (e.g., a range of memory addresses) specified via one or more registers of the memory sub-system 110.

For a memory address mapping to a set of physical memory locations (e.g., row), selection data associated with the set of physical memory locations, and rollback data associated the set of physical memory locations, the versioning mechanism 113 can perform a read operation (e.g., in response to a read memory command from the host system 120) by reading data from a currently-selected data unit (e.g., currently-selected cache line) identified by the selection data, and providing the read data in response to the read operation.

The versioning mechanism 113 can perform a write operation (e.g., in response to a write memory command from the host system 120) by determining whether the rollback data 204 (FIG. 2) indicates that the currently-selected data unit is dirty (e.g., written to since last a checkpoint operation). In response to determining that the rollback data indicates that the currently-selected data unit is dirty, the versioning mechanism 113 can write data to the currently-selected data unit. In response to determining that the rollback data indicates that the currently-selected data unit is not dirty (e.g., which can indicate the cache line has not been written to since a last time of a checkpoint operation), the versioning mechanism 113 can: write data to another data unit not currently identified by the selection data as the currently-selected data unit; set the selection data to identify the other data unit; and set the rollback data to indicate that the currently-selected data unit is dirty. The setting of the selection data and the rollback data can be by way of an atomic (e.g., uninterruptable) operation.

The versioning mechanism 113 can perform a checkpoint operation (e.g., in response to a checkpoint memory command from the host system 120) by determining whether the rollback indicates that the currently-selected data unit is dirty. In response to determining that the rollback data indicates that the currently-selected data unit is not dirty, nothing is done by the versioning mechanism 113. However, in response to determining that the rollback data indicates that the currently-selected data unit is dirty, the versioning mechanism 113 can set the rollback data to indicate that the currently-selected data unit is not dirty. The setting of the selection data and the rollback data can be by way of an atomic (e.g., uninterruptable) operation. After performing a checkpoint operation on a memory address, a previously speculative memory state (e.g., dirty state) of the currently-selected data unit can now be an active state (e.g., non-dirty state).

The versioning mechanism 113 can perform a rollback operation (e.g., in response to a rollback memory command from the host system 120) by determining whether the rollback indicates that a currently-selected data unit identified by the selection data is dirty. In response to determining that the rollback data indicates that the currently-selected data unit is not dirty, nothing is done by the versioning mechanism 113. However, in response to determining that the rollback data indicates that the currently-selected data unit is dirty, the versioning mechanism 113 can set the rollback data to indicate that the currently-selected data unit is not dirty, and set the selection data to identify another data unit (e.g., another cache line) not currently identified by the selection data as the currently-selected data unit. After performing a rollback operation on a memory address, if data in the currently-selected data unit has been modified since the last time a checkpoint operation was performed (as indicated by the rollback data), this modified version of data can be effectively dropped and the state of data currently associated with the memory address can revert to a previous version of data stored in another data unit.

For some embodiments, the memory sub-system 110 supports transactional memory features or functionality. Where the memory sub-system 110 implements transactional memory features or functionality, the memory sub-system controller 115 of some embodiments can receive a read or write memory command from the host system 120, where the memory command comprises an indication of whether the memory command is part of a memory transaction. The memory command can further comprise a requester identifier, such as a writer identifier (ID) which can identify a process on the host system 120 that is requesting the memory command. The versioning mechanism 113 can cause the memory sub-system controller 115 to send (e.g., issue) a conflict error to the host system 120 in response to the memory sub-system controller 115 determining that the rollback data indicates that the currently-selected data unit is dirty and that the rollback data was set in association with (e.g., by a requester having) a different requester identifier (e.g., different writer ID), which can be regarded as a write conflict. Additionally, the versioning mechanism 113 can cause the memory sub-system controller 115 to perform a rollback operation in response to the write conflict. Alternatively, use of a requester identifier can be avoided if the versioning mechanism 113 causes the memory sub-system controller 115 to ignore write conflicts for a memory transaction except when a write conflict is detected for a first write to a given memory address (e.g., if a memory transaction's first write to a memory address does not trigger a write conflict, it can mean that the memory transaction already possess write privilege to that memory address).

With respect to a read memory command associated with a memory transaction, the versioning mechanism 113 can consider changes to data as being invisible to the host system 120 until a memory transaction is completed or committed. In view of this, the versioning mechanism 113 can cause the memory sub-system controller 115 to process a read memory command (associated with a memory transaction) by reading data from a currently-selected data unit identified by the selection data in response to the rollback data indicating that the currently-selected data unit is not dirty, and reading data from another data unit (not identified by the selection data) in response to the rollback data indicating that the currently-selected data unit is dirty.

As described herein, the versioning mechanism 113 can be implemented as part of the local media controller 135 of the memory device 130. In this way, the versioning mechanism 113 can enable at least one feature described herein to be implemented on the memory device 130 independent of the memory sub-system controller 115.

Figure 2:
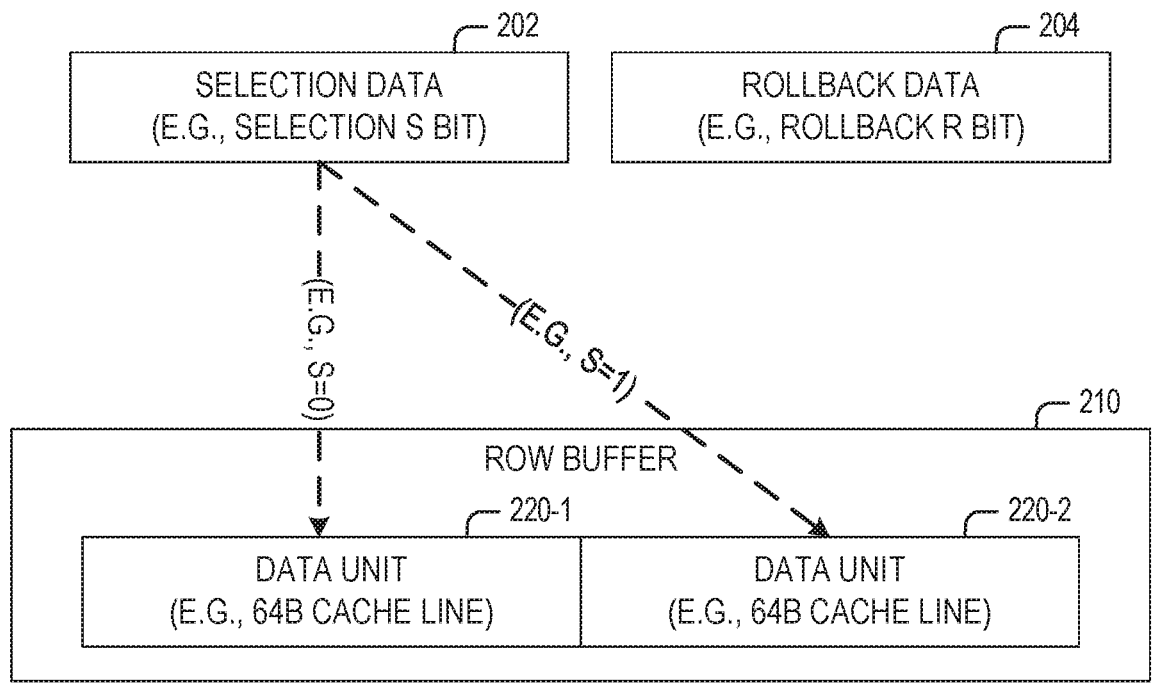
FIG. 2 is a diagram illustrating an example of how selection data, rollback data, and a row buffer of a memory device are used in accordance with some embodiments of the present disclosure.

FIG. 2 is a diagram illustrating an example of how selection data 202, rollback data 204, and a row buffer 210 of a memory device are used in accordance with some embodiments of the present disclosure. For some embodiments, the selection data 202 identifies one cache line as the currently selected cache line (e.g., for read or write operations), and the rollback data 204 indicates whether the cache lines identified by the selection data 202 is dirty (e.g., written to since the last time checkpoint operation was performed). The row buffer 210 can be part of a memory device (e.g., 130, 140), and a given memory device can comprise a plurality of row buffers, with each row buffer being associated with a range of memory addresses or range of individual sets of physical memory locations (e.g., range of rows).

As illustrated, the row buffer 210 is configured to store a pair of cache lines 220-1, 220-2 that is being read from, or written to, an individual set of physical memory locations (e.g., an individual row). According to some embodiments, the selection data 202, the rollback data 204, and the pair of cache lines 220-1, 220-2 stored on the row buffer 210 are associated with the individual set of physical memory locations (e.g., the individual row) of a memory device (e.g., 130, 140). The selection data 202 can comprise a selection bit (S) that identifies either the cache line 220-1 or the cache line 220-2 (e.g., selection bit set to 0 or false identifies the cache line 220-1, and selection bit set to 1 or true identifies the cache line 220-2). Additionally, the rollback data 204 can comprise a rollback bit (R) that indicates whether the cache line is dirty (e.g., rollback bit set to 1 or true to indicate dirty, and rollback bit set to 0 or false to indicate not dirty).

In the context of FIG. 2, performing a read operation (e.g., in response to a read memory command from a host system 120) can comprise reading data from one of the cache lines 220-1, 220-2 identified by the selection data 202 as the currently-selected data unit, and providing the read data in response to the read operation. Performing a write operation (e.g., in response to a write memory command from a host system 120) can comprise: determining whether the rollback data 204 indicates that the cache line identified by the selection data 202 is dirty (e.g., dirty if R=1, and not dirty if R=0); and in response to determining that the rollback data 204 indicates that the cache line identified by the selection data 202 is dirty (e.g., which can indicate the cache line has been written to since a last time a checkpoint operation was performed on the related memory address), writing data to one of the cache lines 220-1, 220-2 identified by the selection data 202 (e.g., cache line 220-1 if S=0, and cache line 220-2 if S=1) as the currently-selected cache line. In response to determining that the rollback data 204 indicates that the cache line identified by the selection data 202 is not dirty (e.g., which can indicate the cache line has not been written to since a last time a checkpoint operation was performed on the related memory address): data can be written to the other cache line not currently identified by the selection data 202 as the currently-selected cache line; the selection data 202 can be set to identify the other cache line (e.g., S set to NOT(S)); and the rollback data 204 can be set to indicate that the cache line identified by the selection data 202 is dirty (e.g., R set to 1 or true). The setting of the selection data 202 and the rollback data 204 can be by way of an atomic (e.g., uninterruptable) operation.

Depending on embodiment, a checkpoint operation can be performed in response to a memory command (e.g., checkpoint memory command) from a host system, and a rollback operation can be performed in response to a memory command (e.g., rollback memory command) from a host system. A checkpoint operation can be performed on a single memory address or on a range of consecutive memory addresses. Similarly, a rollback operation can be performed on a single memory address or on a range of consecutive memory addresses. For some embodiments, checkpoint operations can be performed as part of refresh operation (e.g., DRAM refresh operation) being performed (e.g., periodically) on one or more memory addresses.

In the context FIG. 2, performing a checkpoint operation (e.g., in response to a checkpoint memory command from the host system 120) can comprise: determining whether the rollback data 204 indicates that the cache line identified by the selection data 202 is dirty (e.g., dirty if R=1, and not dirty if R=0); in response to determining that the rollback data 204 indicates that the cache line identified by the selection data 202 is not dirty, nothing is done; and in response to determining that the rollback data 204 indicates that the cache line identified by the selection data 202 is dirty, setting the rollback data 204 to indicate that the cache line identified by the selection data 202 is not dirty (e.g., R set to 0 or false). The setting of the selection data 202 and the rollback data 204 can be by way of an atomic (e.g., uninterruptable) operation. After performing a checkpoint operation on a memory address, a previously speculative memory state (e.g., dirty state) of the cache line currently identified by the selection data 202 can now be an active state (e.g., non-dirty state).

With respect to FIG. 2, performing a rollback operation (e.g., in response to a rollback memory command from the host system 120) can comprise: determining whether the rollback data 204 indicates that the cache line identified by the selection data 202 is dirty (e.g., dirty if R=1, and not dirty if R=0); in response to determining that the rollback data 204 indicates that the cache line identified by the selection data 202 is not dirty, nothing is done; and in response to determining that the rollback data 204 indicates that the cache line identified by the selection data 202 is dirty, setting the rollback data 204 to indicate that the cache line identified by the selection data 202 is not dirty (e.g., R set to 0 or false), and setting the selection data 202 to identify the other cache line not currently identified by the selection data 202 as the currently-selected data unit (e.g., S set to NOT(S)). After performing a rollback operation on a memory address, if data in the cache line (e.g., 220-1) currently identified by the selection data 202 (e.g., identified by S) has been modified since the last time a checkpoint operation was performed (as indicated by the rollback data 204), this modified version of data can be effectively dropped and the state of data currently associated with the memory address can revert to a previous version of data stored in the other cache line identified by NOT(S) (e.g., 220-2).

For some embodiments, the selection data 202 and the rollback data 204 can be stored on the individual set of physical memory locations (e.g., individual row) of the memory device with the cache lines 220-1, 220-2. For instance, the selection data 202 and the rollback data 204 can be stored as metadata with the cache lines 220-1, 220-2. Where serialization optimization is applied to FIG. 2, metadata storing the selection data 202 and the rollback data 204 can be stored on the row buffer 210 in a first position (e.g., position zero) with the cache line 220-1 and, as such, the cache line 220-1 and the metadata (containing the selection data 202 and the rollback data 204) can be read concurrently from the row buffer 210. With serial optimization, the row buffer 210 can be serially accessed, with the first position of the row buffer being accessed (e.g., read) first. A second position (e.g., position one) of the row buffer 210, storing the cache line 220-2, can be subsequently accessed (e.g., read) in response to determining that the selection data 202 (previously read with the cache line 220-1) identifies the cache line 220-2 as the currently-selected cache line. In this way, some embodiments can reduce the number of access (e.g., read or write) operations performed when reading the row buffer 210 in a serial manner. A process can be performed (e.g., performed periodically, such as during a refresh operation or an idle period) that ensures that the cache line that is dirty is stored in the first position, which can increase the likelihood of the first position of the row buffer 210 containing the cache line with current data at a time of access request (e.g., read or write request). The process can be performed as part of a checkpoint operation. As described herein, this serialization optimization can reduce the amount of times the selection data 202 and the rollback data 204 are checked for each read or write access, which can reduce average access latency.

Where FIG. 2 is used in a transactional memory system, a read or write memory command from a host system can comprise an indication of whether the memory command is part of a memory transaction. A memory command to write data can comprise a requester identifier, such as a writer identifier (ID), which can identify a process on the host system that is requesting the memory command. The host system can receive a conflict error if the rollback data 204 indicates that the cache line currently identified by the selection data 202 is dirty and that the rollback data 204 was set in association with (e.g., by a requester having) a different requester identifier (e.g., different writer ID), which can be regarded as a write conflict. Additionally, a rollback operation can be performed in response to the write conflict. Alternatively, use of a requester identifier can be avoided if write conflicts are ignored for a memory transaction except when a write conflict is detected for a first write to a given memory address.

With respect to a read memory command associated with a memory transaction, changes to data can be considered invisible to a host system until a memory transaction is completed or committed. Accordingly, a read memory command associated with a memory transaction can result in a read from the cache line identified by the selection data 202 in response to the rollback data 204 indicating that the cache line is not dirty, and can result in a read from the other cache line (not identified by the selection data 202) in response to the rollback data 204 indicating that the cache line is dirty.

FIGS. 3 through 15 are flow diagrams of example methods for using versioning of stored data on a memory device, in accordance with some embodiments of the present disclosure. The methods 300, 400, 500, 600, 700, 800, 900, 1000, 1100, 1200, 1300, 1400, 1500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, at least one of the methods 300, 400, 500, 600, 700, 800, 900, 1000, 1100, 1200, 1300, 1400, 1500 is performed by the memory sub-system controller 115 of FIG. 1 based on the versioning mechanism 113. Additionally, or alternatively, for some embodiments, at least one of the methods 300, 400, 500, 600, 700, 800, 900, 1000, 1100, 1200, 1300, 1400, 1500 is performed, at least in part, by the local media controller 135 of the memory device 130 of FIG. 1, or by an on-die controller or state machine of the memory device 135. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are used in every embodiment. Other process flows are possible.

Referring now to the method 300 of FIG. 3, the method 300 illustrates an example of performing a data versioning operation, such as a rollback operation or a checkpoint operation, on a set of physical memory locations, in accordance with some embodiments. At operation 302, a processing device (e.g., the processor 117 of the memory sub-system controller 115) receives from a host system (e.g., 120) a memory command associated with a memory address, where the memory address maps to a set of physical memory locations of a memory device (e.g., 130, 140), and the memory device comprises a row buffer configured to store a plurality of data units (e.g., cache lines) for the set of physical memory locations.

For various embodiments described herein, the row buffer facilitates access to the set of physical memory locations by storing a plurality of data units that is read from, or that is being written to, the set of physical memory locations. For example, the row buffer can comprise a row buffer of a DRAM device that facilitates access to a physical row of the DRAM device. Each data unit of the plurality of data units can comprise a cache line of data. Additionally, the size of each data unit, the number of data units, or both can be configurable (e.g., by a setting of the memory sub-system 110). The memory device can comprise multiple row buffers, with each row buffer facilitating access to a different range of physical memory locations (e.g., different range of rows of the memory device).

For some embodiments, the plurality of data units (e.g., cache lines) comprises a first data unit (e.g., the cache line 220-1) and a second data unit (e.g., the cache line 220-2), and the selection data (e.g., 202) comprises a selection bit (e.g., S bit), where the selection bit identifies one of the first data unit or the second data unit (e.g., 220-1 or 220-2). Additionally, for some embodiments, the rollback data (e.g., 204) comprises a rollback bit that indicates whether the currently-selected data unit is dirty or not dirty.

As part of operation 302, the processing device can cause stored data to be read from the set of physical memory locations (e.g., row) to the row buffer, prior to the rollback operation or the checkpoint operation being performed on the set of physical memory locations. For some embodiments, the stored data (read from the set of physical memory locations) comprises at least one of the selection data or the rollback data, where the selection data, the rollback data, or both are stored on the set of physical memory locations in-line with the plurality of data units. Where the selection data, the rollback data, or both are part of the stored data read from the set of physical memory locations to the row buffer, the row buffer can store the selection data, the rollback data, or both with the plurality of data units. For instance, where the selection data, the rollback data, or both are stored as metadata of one of the data units (e.g., data unit stored at a first position of the row buffer), the row buffer can store the metadata with that data unit, thereby rendering the selection data and/or the rollback data stored within accessible to the memory sub-system controller (e.g., 115). For some embodiments, such storage on the row buffer can enable some embodiments to facilitate serialization optimization (as described herein) when serially accessing the row buffer. Alternatively, the selection data, the rollback data, or both can be stored in reserved data store space, which can be located on the memory device (e.g., 130, 140), located on the memory sub-system controller (e.g., 115), or located somewhere else on the memory sub-system (e.g., 110).

In response to receiving the memory command at operation 302, the processing device (e.g., the processor 117) performs a data versioning operation (either a rollback operation or a checkpoint operation) on the set of physical memory locations at operation 304, where the data versioning operation is performed using the row buffer and at least one of selection data or rollback data associated with the set of physical memory locations. According to various embodiments, the selection data identifies a data unit of a plurality of data units (stored on the row buffer) as a currently-selected data unit, and the rollback data indicates whether the currently-selected data unit is dirty. For some embodiments, a dirty indication indicates that the currently-selected data unit has been written to since a last time the checkpoint operation was performed on (e.g., in connection with) the set of physical memory locations. Examples of how operation 304 can be performed are illustrated and described with respect to FIGS. 4 and 5.

Figure 4:
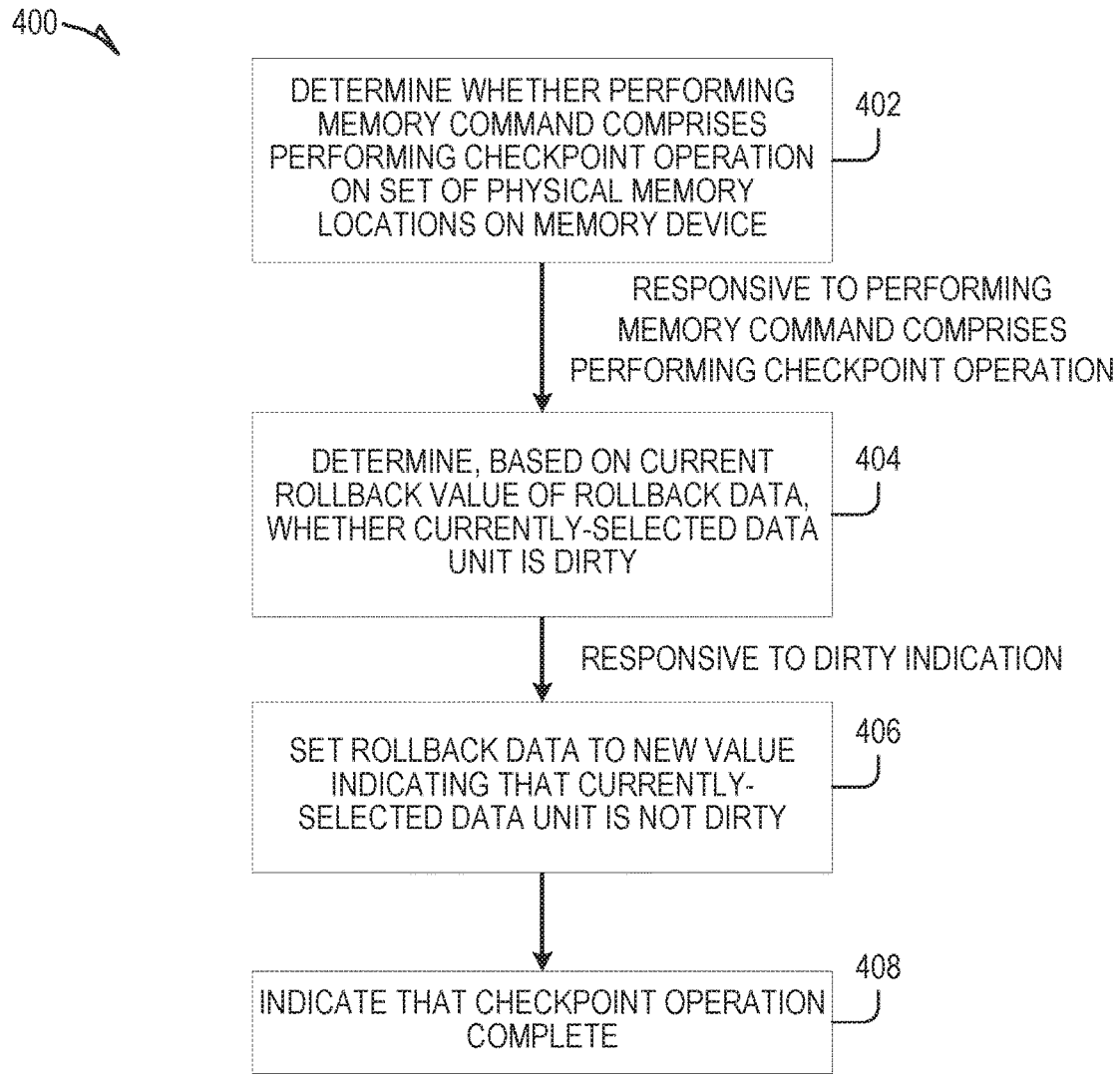

Referring now to the method 400 of FIG. 4, the method 400 illustrates an example of performing a checkpoint operation on a set of physical memory locations that maps to a memory address, in accordance with some embodiments. At operation 402, a processing device (e.g., the processor 117 of the memory sub-system controller 115) determines whether performing a memory command received from a host system (e.g., 120) comprises performing a checkpoint operation on a set of physical memory locations of a memory device (e.g., 130, 140). For instance, the memory command can comprise a checkpoint memory command to perform the checkpoint operation on a single memory address (e.g., that maps to the set of physical memory locations), or multiple memory addresses (e.g., range of memory addresses) that include the single memory address.

In response to determining that performing the memory command comprises performing the checkpoint operation on the set of physical memory locations, at operation 404, the processing device (e.g., the processor 117) determines whether a currently-selected data unit identified by selection data is dirty based on a current rollback value of rollback data, where the selection data and the rollback data are associated with the set of physical memory locations. For some embodiments, a dirty indication represents that the currently-selected data unit has been written to since a last time the checkpoint operation was performed on the set of physical memory locations.

In response to determining (at operation 404) that the currently-selected data unit is dirty, the processing device (e.g., the processor 117) sets rollback data to a new rollback value at operation 406, where the rollback data is associated with the set of physical memory locations, and where the new rollback value indicates that a currently-selected data unit is not dirty. By way of operation 404, the currently-selected data unit identified by the selection data can transition from dirty to not dirty.

The processing device (e.g., the processor 117) indicates that the checkpoint operation on the set of physical memory locations is completed at operation 408. This completion indication can be sent to a host system (e.g., 120), and can be sent to the host system in response to a memory command (e.g., checkpoint memory command) received from the host system. Additionally, the completion indication can indicate whether the checkpoint operation was successful or unsuccessful.

Figure 5:
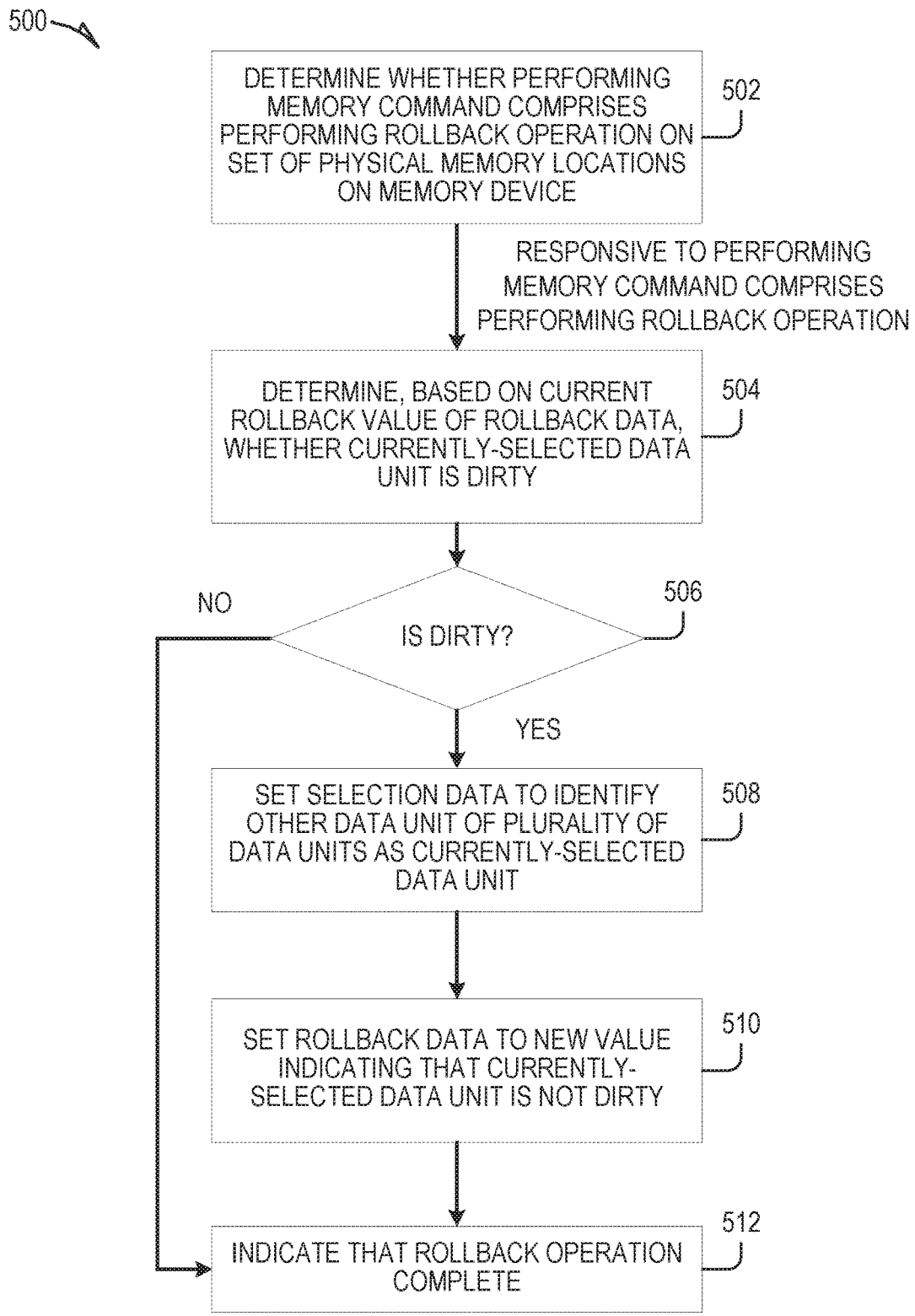

Referring now to the method 500 of FIG. 5, the method 500 illustrates an example of performing a rollback operation on a set of physical memory locations that maps to a memory address, in accordance with some embodiments. At operation 502, a processing device (e.g., the processor 117 of the memory sub-system controller 115) determines whether performing a memory command received from a host system (e.g., 120) comprises performing a rollback operation on a set of physical memory locations of a memory device (e.g., 130, 140). For instance, the memory command can comprise a rollback memory command to perform the rollback operation on a single memory address (e.g., that maps to the set of physical memory locations), or multiple memory addresses (e.g., range of memory addresses) that include the single memory address.

In response to determining that performing the memory command comprises performing the rollback operation on the set of physical memory locations, at operation 504, the processing device (e.g., the processor 117) determines whether a currently-selected data unit identified by selection data is dirty based on a current rollback value of rollback data, where the selection data and the rollback data are associated with the set of physical memory locations. For some embodiments, a dirty indication represents that the currently-selected data unit has been written to since a last time the checkpoint operation was performed on the set of physical memory locations.

Where the processing device (e.g., the processor 117) determines that the currently-selected data unit is dirty at operation 506, the method 500 proceeds to operation 508; otherwise the method 500 proceeds to operation 512. At operation 508, the processing device (e.g., the processor 117) sets selection data to identify another data unit of a plurality of data units (stored on a row buffer of the memory device) as a currently-selected data unit. For some embodiments, operation 508 comprises identifying the currently-selected data unit (e.g., cache line 220-1) identified by the selection data, identifying another data unit (e.g., cache line 220-2) of the plurality of data units that is different from the currently-selected data unit, and setting the selection data to identify the other data unit as the currently-selected data unit. The other data unit can store, on the set of physical memory locations, a previous version of data for the memory address.

The processing device (e.g., the processor 117), at operation 510, sets rollback data to a new rollback value, where the new rollback value indicates that the currently-selected data unit (identified by the selection data after operation 508) is not dirty (e.g., has not been written to since the last time the checkpoint operation was performed on the set of physical memory locations). From operation 510, the method 500 proceeds to operation 512.

The processing device (e.g., the processor 117) indicates that the rollback operation on the set of physical memory locations is completed at operation 512. This completion indication can be sent to a host system (e.g., 120), and can be sent to the host system in response to a memory command (e.g., rollback memory command) received from the host system. Additionally, the completion indication can indicate whether the rollback operation was successful or unsuccessful.

Referring now to the method 600 of FIG. 6, the method 600 illustrates an example of performing a data versioning operation, such as a rollback operation or a checkpoint operation, on a set of physical memory locations, in accordance with some embodiments. For some embodiments, operations 602 and 604 are respectively similar to operations 302 and 304 of the method 300 described with respect to FIG. 3. At operation 606, a processing device (e.g., the processor 117 of the memory sub-system controller 115) performs a refresh operation on a set of physical memory locations (e.g., row) of a memory device (e.g., 130, 140), where the refresh operation comprises performing a checkpoint operation on the set of physical memory locations. For some embodiments, operation 606 is performed periodically on the set of physical memory locations, thereby resulting in the checkpoint operation being performed periodically on the set of physical memory locations. The refresh operation can comprise, for example, a refresh operation performed on a DRAM device. For some embodiments, the checkpoint operation is performed on the set of physical memory locations by a memory sub-system controller (e.g., 115) when the memory sub-system controller detects a period of time during which a memory sub-system (e.g., 110) is considered idle.

Referring now to the method 700 of FIG. 7, the method 700 illustrates example of performing a write memory command on a set of physical memory locations that maps to a memory address, in accordance with some embodiments. At operation 702, a processing device (e.g., the processor 117 of the memory sub-system controller 115) receives from a host system (e.g., 120) a memory command to write host data to a memory address, where the memory address maps to a set of physical memory locations of a memory device (e.g., 130, 140), and the memory device comprises a row buffer configured to store a plurality of data units (e.g., cache lines) for the set of physical memory locations.

In response to receiving the memory command at operation 702, the processing device (e.g., the processor 117) reads a current rollback value of rollback data at operation 704, where the rollback data is associated with the set of physical memory locations. At operation 706, the processing device (e.g., the processor 117) determines whether a currently-selected data unit of the plurality of data units is dirty based on the current rollback value read at operation 704, where the currently-selected data unit is identified by selection data associated with the set of physical memory locations. As described herein, a dirty indication can indicate that the currently-selected data unit has been written to since a last time a checkpoint operation was performed on the set of physical memory locations.

At operation 708, the processing device (e.g., the processor 117) writes the host data to the row buffer of the memory device (e.g., 130, 140) based on determining whether the currently-selected data unit is dirty (at operation 706). An example of how operation 708 can be performed is illustrated and described with respect to FIG. 8.

Figure 8:
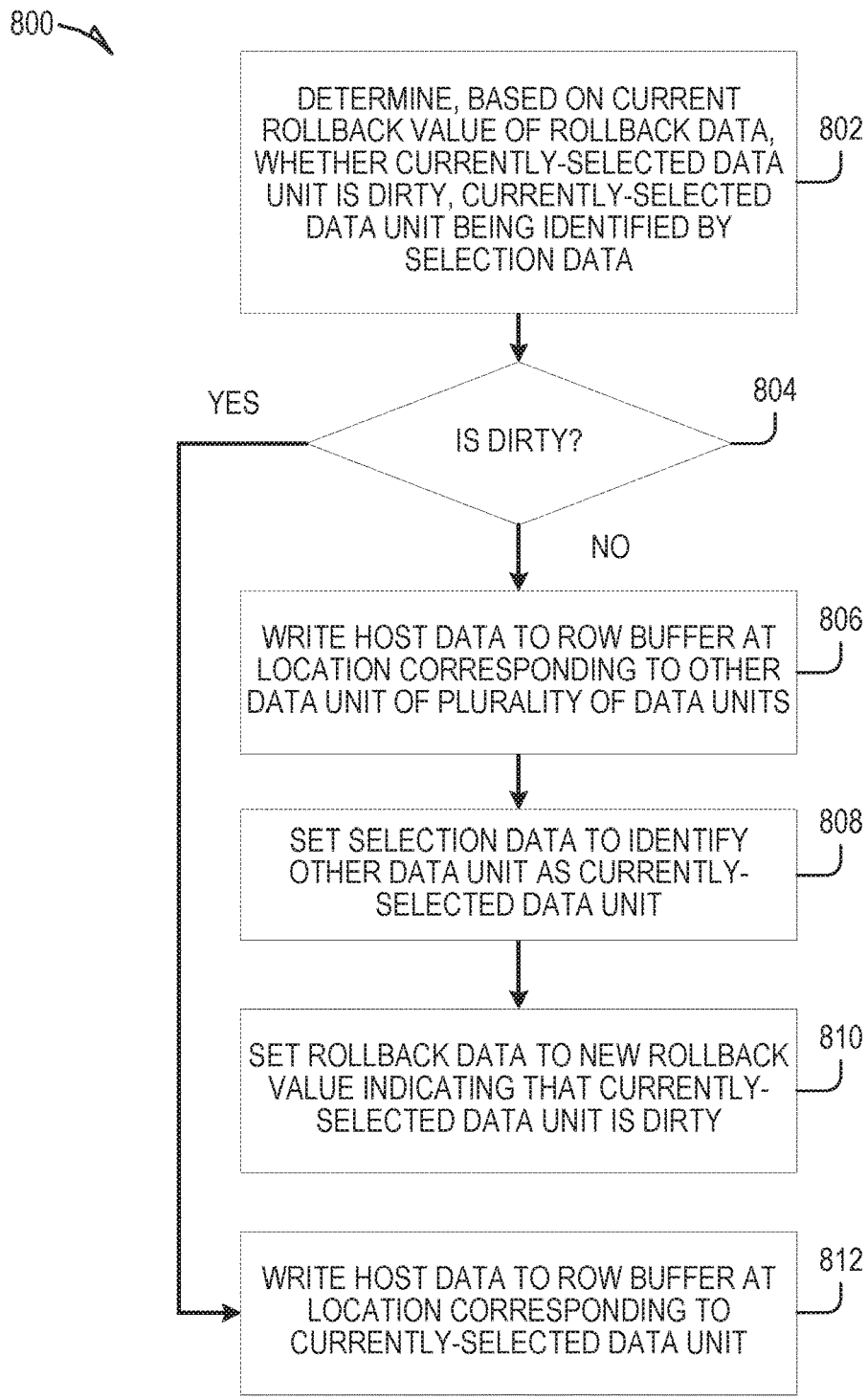

Referring now to the method 800 of FIG. 8, the method 800 illustrates an example of writing host data to a row buffer of a memory device, in accordance with some embodiments. At operation 802, a processing device (e.g., the processor 117 of the memory sub-system controller 115) determines whether a currently-selected data unit of a plurality of data units is dirty based on a current rollback value of rollback data, where the currently-selected data unit is identified by selection data associated with the set of physical memory locations, and the rollback data is associated with the set of physical memory locations.

Where the processing device (e.g., the processor 117) determines that the currently-selected data unit is dirty at operation 804, the method 800 proceeds to operation 812; otherwise the method 800 proceeds to operation 806. At operation 806, the processing device (e.g., the processor 117) writes the host data to the row buffer at a location corresponding to another data unit of the plurality of data units (stored on a row buffer of the memory device). For some embodiments, operation 806 comprises identifying the currently-selected data unit (e.g., cache line 220-1) identified by the selection data, identifying another data unit (e.g., cache line 220-2) of the plurality of data units that is different from the currently-selected data unit, and writing the host data to the row buffer at the location corresponding to the other data unit. The processing device (e.g., the processor 117) sets the selection data to identify the other data unit as the currently-selected data unit at operation 808. Additionally, at operation 810, the processing device (e.g., the processor 117) sets the rollback data to a new rollback value, where the new rollback value indicates that the currently-selected data unit (identified by the selection data by operation 808) is dirty. As described herein, a dirty indication can indicate that the currently-selected data unit has been written to since the last time the checkpoint operation was performed on the set of physical memory locations.

At operation 812, the processing device (e.g., the processor 117) writes the host data to the row buffer at a location corresponding to the currently-selected data unit identified by the selection data.

Figure 9:
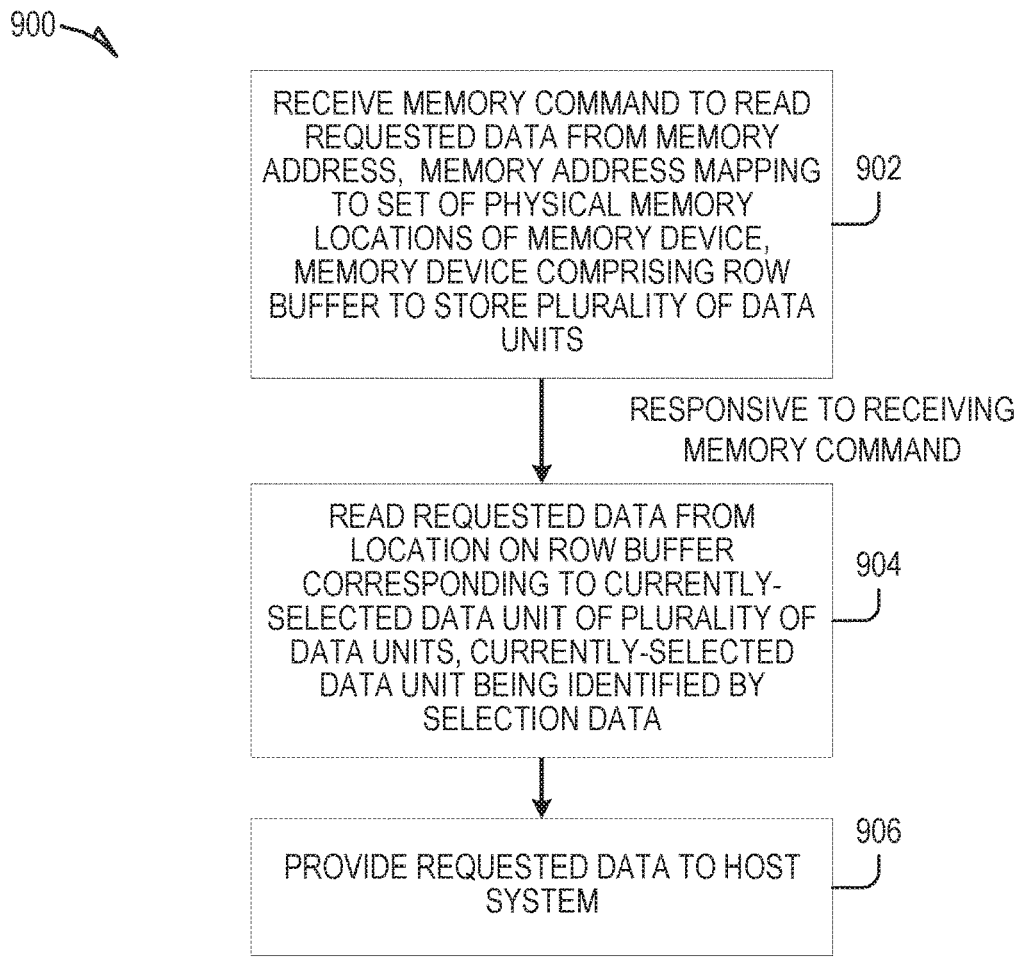

Referring now to the method 900 of FIG. 9, the method 900 illustrates an example of performing a read memory command on a set of physical memory locations that maps to a memory address, in accordance with some embodiments. At operation 902, a processing device (e.g., the processor 117 of the memory sub-system controller 115) receives from a host system (e.g., 120) a memory command to read requested data from a memory address, where the memory address maps to a set of physical memory locations of a memory device (e.g., 130, 140), and the memory device comprises a row buffer configured to store a plurality of data units (e.g., cache lines) for the set of physical memory locations.

In response to receiving the memory command at operation 902, the processing device (e.g., the processor 117) reads the requested data from a location on the row buffer corresponding to a currently-selected data unit identified by selection data, where the selection data is associated with the set of physical memory locations. At operation 906, the processing device (e.g., the processor 117) provides the requested data (read at operation 904) to the host system (e.g., 120).

Figure 10:
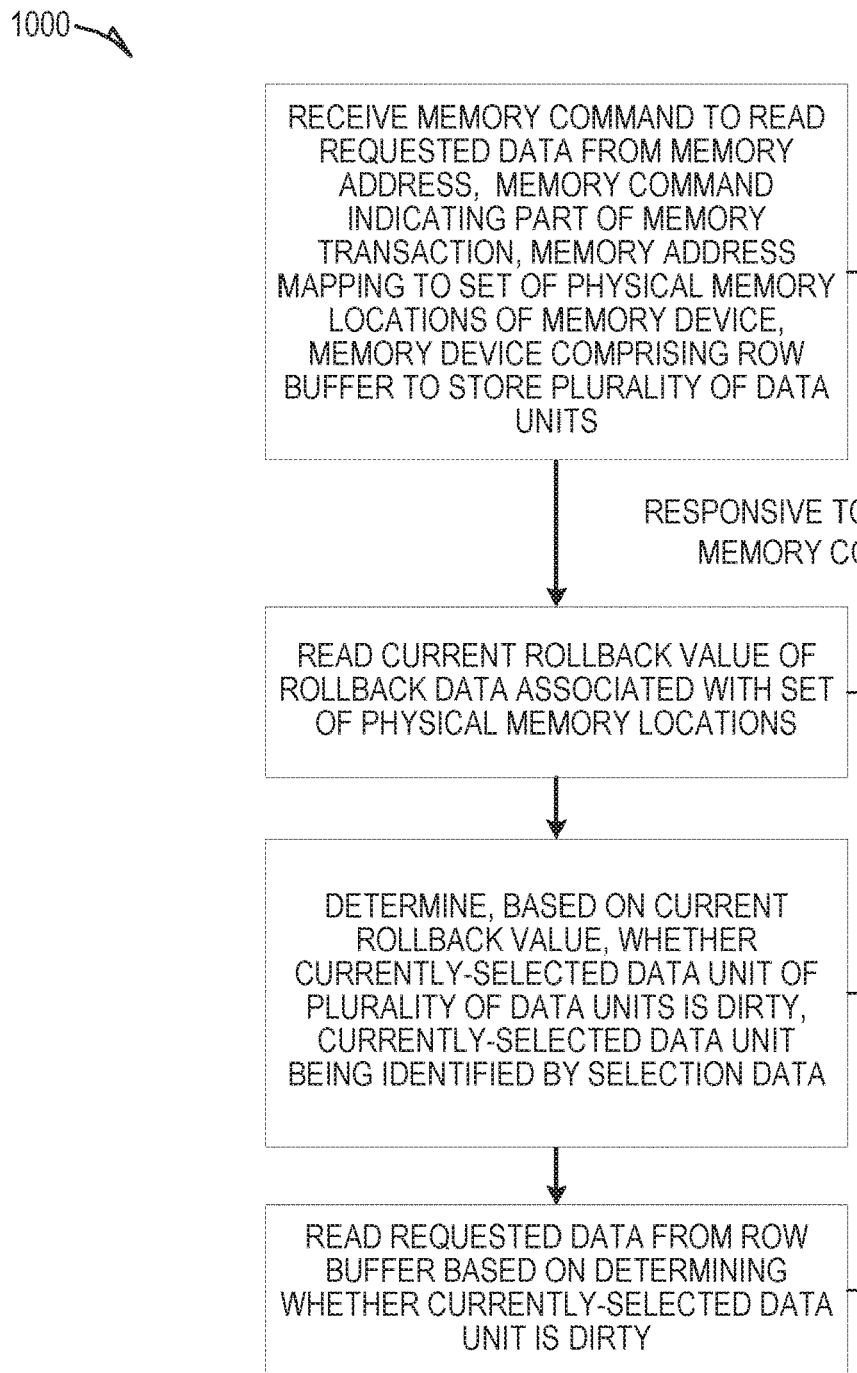

Referring now to the method 1000 of FIG. 10, the method 1000 illustrates example of performing a read memory command on a set of physical memory locations in connection with a memory transaction, in accordance with some embodiments. At operation 1002, a processing device (e.g., the processor 117 of the memory sub-system controller 115) receives from a host system (e.g., 120) a memory command to read requested data from a memory address, where the memory command indicates that it is part of a memory transaction, where the memory address maps to a set of physical memory locations of a memory device (e.g., 130, 140), and where the memory device comprises a row buffer configured to store a plurality of data units (e.g., cache lines) for the set of physical memory locations.

In response to receiving the memory command at operation 1002, the processing device (e.g., the processor 117) reads a current rollback value of rollback data at operation 1004, where the rollback data is associated with the set of physical memory locations. At operation 1006, the processing device (e.g., the processor 117) determines whether a currently-selected data unit of the plurality of data units is dirty based on the current rollback value read at operation 1004, where the currently-selected data unit is identified by selection data associated with the set of physical memory locations. For some embodiments, a dirty indication indicates that the current memory transaction is not complete or not committed with respect to the set of physical memory locations (e.g., row). According to some embodiments, a data unit (e.g., cache line) storing data that is modified during a memory transaction is not visible until the memory transaction is completed or committed.

At operation 1008, the processing device (e.g., the processor 117) reads the requested data from the row buffer of the memory device (e.g., 130, 140) based on determining whether the currently-selected data unit is dirty (at operation 1006). An example of how operation 1008 can be performed is illustrated and described with respect to FIG. 11.

Figure 11:
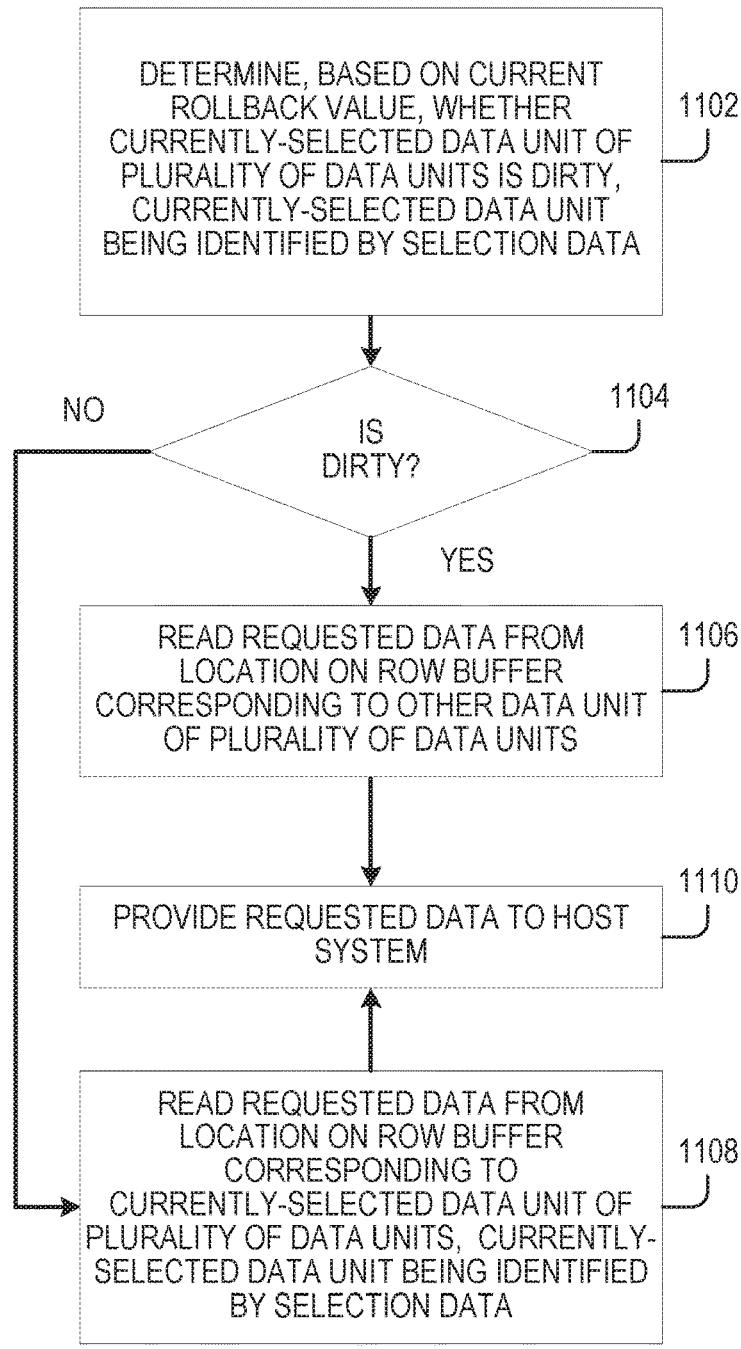

Referring now to the method 1100 of FIG. 11, the method 1100 illustrates an example of reading requested data from a row buffer of a memory device in connection with a memory transaction, in accordance with some embodiments. At operation 1102, a processing device (e.g., the processor 117 of the memory sub-system controller 115) determines whether a currently-selected data unit of a plurality of data units is dirty based on a current rollback value of rollback data, where the currently-selected data unit is identified by selection data associated with the set of physical memory locations, and the rollback data is associated with the set of physical memory locations.

Where the processing device (e.g., the processor 117) determines that the currently-selected data unit is dirty at operation 1104, the method 1100 proceeds to operation 1106; otherwise the method 1100 proceeds to operation 1108. At operation 1106, the processing device (e.g., the processor 117) reads the requested data from a location on the row buffer corresponding to another data unit of the plurality of data units (stored on a row buffer of the memory device). For some embodiments, operation 1106 comprises identifying the currently-selected data unit (e.g., cache line 220-1) identified by the selection data, identifying another data unit (e.g., cache line 220-2) of the plurality of data units that is different from the currently-selected data unit, and reading the requested data from the location on the row buffer corresponding to the other data unit. From operation 1106, the method 1100 proceeds to operation 1110, where the processing device (e.g., the processor 117) provides the requested data to the host system (e.g., 120).

The processing device (e.g., the processor 117), at operation 1108, reads the requested data from a location on the row buffer corresponding to the currently-selected data unit identified by the selection data. From operation 1108, the method 1100 proceeds to operation 1110 and the processing device (e.g., the processor 117) provides the requested data to the host system (e.g., 120).

Figure 12:
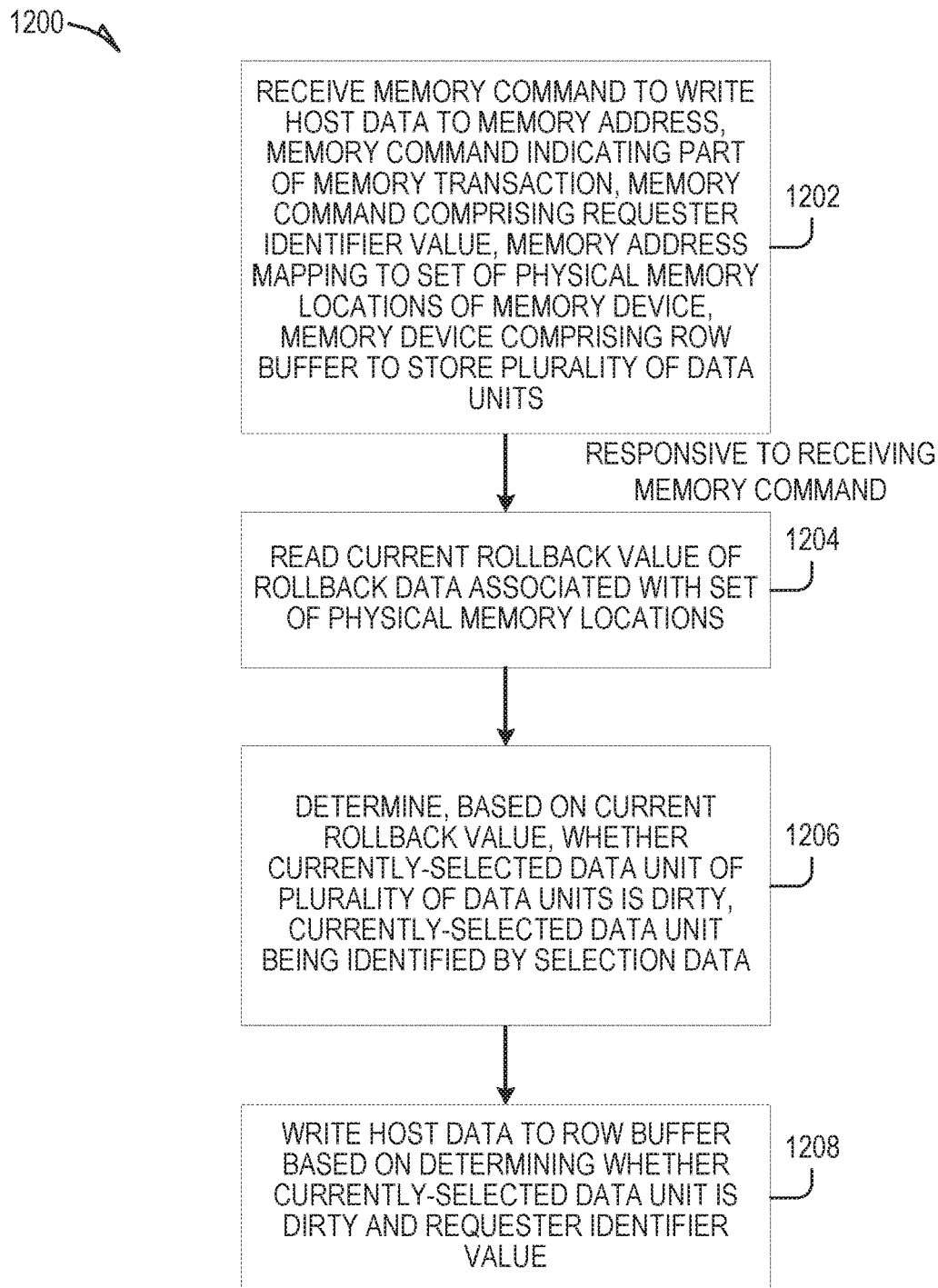

Referring now to the method 1200 of FIG. 12, the method 1200 illustrates an example of performing a write memory command on a set of physical memory locations in connection with a memory transaction, in accordance with some embodiments. At operation 1202, a processing device (e.g., the processor 117 of the memory sub-system controller 115) receives from a host system (e.g., 120) a memory command to write host data to a memory address, where the memory command indicates that it is part of a memory transaction, where the memory address maps to a set of physical memory locations of a memory device (e.g., 130, 140), and where the memory device comprises a row buffer configured to store a plurality of data units (e.g., cache lines) for the set of physical memory locations.

In response to receiving the memory command at operation 1202, the processing device (e.g., the processor 117) reads a current rollback value of rollback data at operation 1204, where the rollback data is associated with the set of physical memory locations. At operation 1206, the processing device (e.g., the processor 117) determines whether a currently-selected data unit of the plurality of data units is dirty based on the current rollback value read at operation 1204, where the currently-selected data unit is identified by selection data associated with the set of physical memory locations. As described herein, a dirty indication can indicate that the current memory transaction is not complete or not committed with respect to the set of physical memory locations (e.g., row).

At operation 1208, the processing device (e.g., the processor 117) writes the host data to the row buffer of the memory device (e.g., 130, 140) based on determining whether the currently-selected data unit is dirty (at operation 1206). An example of how operation 1208 can be performed is illustrated and described with respect to FIG. 13.

Figure 13:
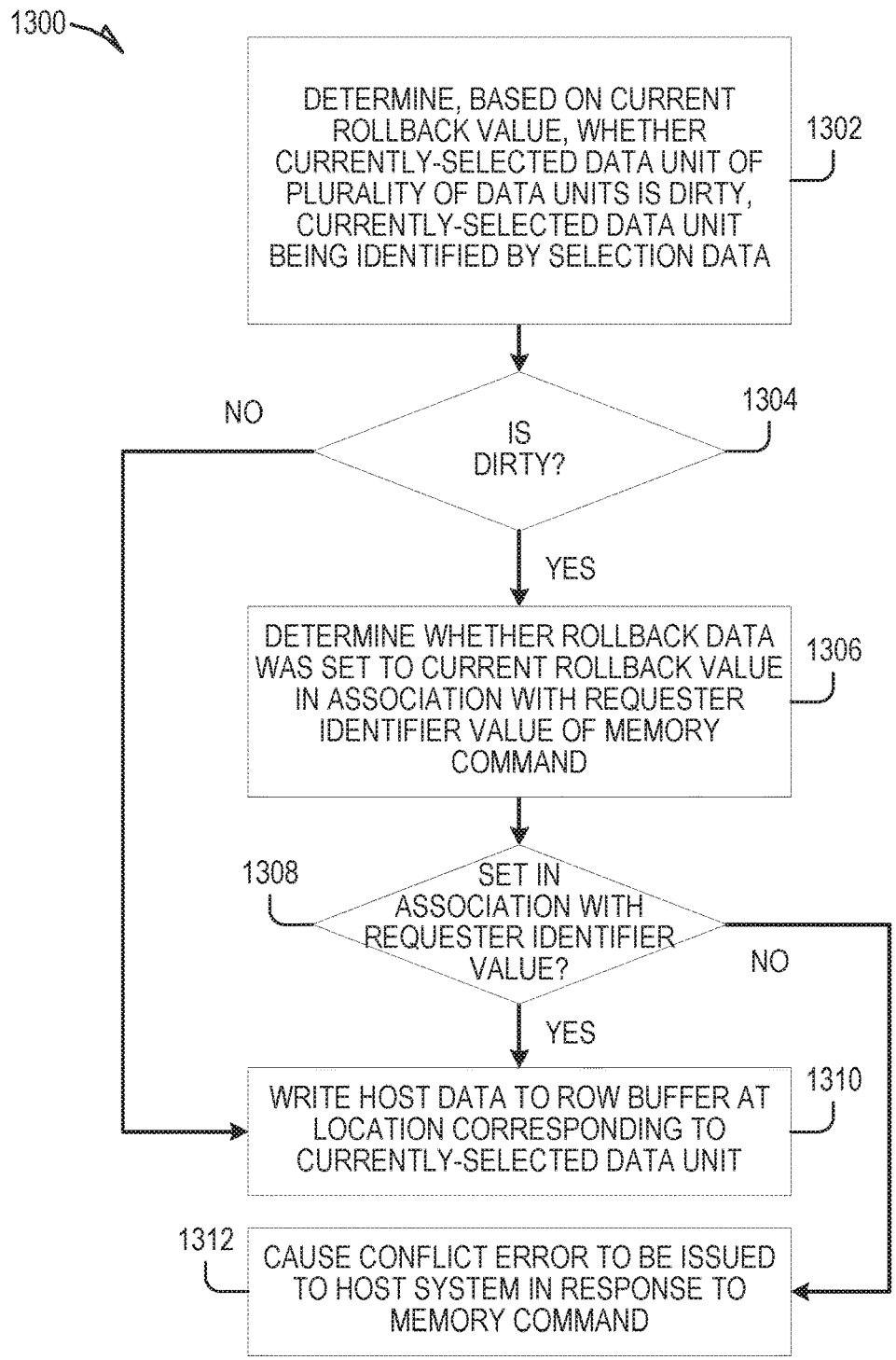

Referring now to the method 1300 of FIG. 13, the method 1300 illustrates an example of writing host data to a row buffer of a memory device in connection with a memory transaction, in accordance with some embodiments. At operation 1302, a processing device (e.g., the processor 117 of the memory sub-system controller 115) determines whether a currently-selected data unit of a plurality of data units is dirty based on a current rollback value of rollback data, where the currently-selected data unit is identified by selection data associated with the set of physical memory locations, and the rollback data is associated with the set of physical memory locations.

Where the processing device (e.g., the processor 117) determines that the currently-selected data unit is dirty at operation 1304, the method 1300 proceeds to operation 1306; otherwise the method 1300 proceeds to operation 1310. At operation 1306, the processing device (e.g., the processor 117) determines whether the rollback data was set to the current rollback value in association with a requester identifier value included by the memory command received from the host system (e.g., set in response to a memory command including the requester identifier). For instance, where a process or thread on the host system (e.g., 120) memory command requests a write, the process or thread can have a writer identifier (ID) and that writer ID can be included in the memory command received by the memory sub-system (e.g., 110). A requester identifier can uniquely identify a process on the host system requesting a read or write memory command.

At operation 1308, where the processing device (e.g., the processor 117) determines that the rollback data was set to the current rollback value in association with the requester identifier value, the method 1300 proceeds to operation 1310; otherwise the method 1300 proceeds to operation 1312.

The processing device (e.g., the processor 117) writes the host data to the row buffer at a location corresponding to the currently-selected data unit (identified by the selection data). At operation 1312, processing device (e.g., the processor 117) causes a conflict error (e.g., in connection with the memory transaction) to be issued to the host system (e.g., 120) in response to the memory command to write the host data. By performing operation 1312, the processing device can inform or effectively inform the host system (e.g., a process on the host system) that the writing privilege to the set of physical memory locations is presently "owned" or controlled by another process or thread having a different requester identifier (e.g., different writer ID) from the one currently associated with setting the rollback data.

Referring now to the method 1400 of FIG. 14, the method 1400 illustrates an example of committing a memory transaction on a set of physical memory locations that maps to a memory address, in accordance with some embodiments. At operation 1402, a processing device (e.g., the processor 117 of the memory sub-system controller 115) receives from a host system (e.g., 120) a memory command to commit (or complete) a memory transaction. Depending on the embodiment, the memory command can include at least one memory address (e.g., range of memory addresses), where the at least one memory address maps to a set of physical memory locations of a memory device (e.g., 130, 140).

In response to receiving the memory command at operation 1402, the processing device (e.g., the processor 117) sets rollback data to a new rollback value at operation 1404, where the new rollback value indicates a currently-selected data unit (identified by selection data) is not dirty, the rollback data is associated with the set of physical memory locations, and the selection data is associated with the set of physical memory locations. For some embodiments, a dirty indication indicates that the current memory transaction is not complete or not committed with respect to the set of physical memory locations (e.g., row). According to some embodiments, a data unit (e.g., cache line) storing data that is modified during a memory transaction is not visible until the memory transaction is completed or committed.

Figure 15:
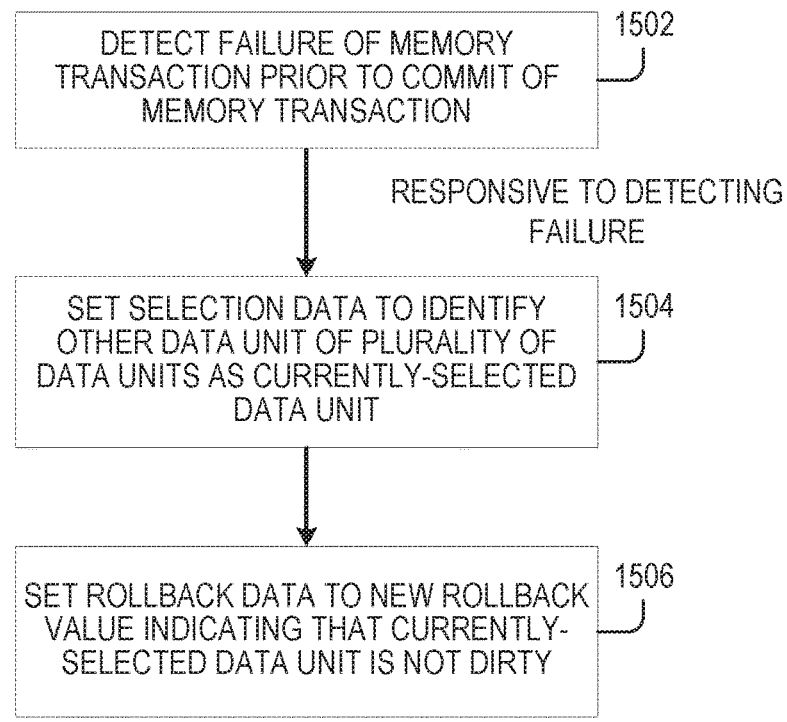

Referring now to the method 1500 of FIG. 15, the method 1500 illustrates an example of performing a rollback on a set of physical memory locations in response to a failure of a memory transaction, in accordance with some embodiments. At operation 1502, a processing device (e.g., the processor 117 of the memory sub-system controller 115) detects for a failure of a memory transaction on a set of physical memory locations prior to a commit of the memory transaction on the set of physical memory locations.

In response to detecting the failure of the memory transaction prior to the commit of the memory transaction at operation 1502, the processing device (e.g., the processor 117), at operation 1504, sets selection data to identify another data unit of a plurality of data units as a currently-selected data unit. For some embodiments, operation 1504 comprises identifying the currently-selected data unit (e.g., cache line 220-1) identified by the selection data, identifying another data unit (e.g., cache line 220-2) of the plurality of data units that is different from the currently-selected data unit, and setting the selection data to identify the other data unit as the currently-selected data unit. The other data unit can store, on the set of physical memory locations, a previous version of data for the memory address.

At operation 1506, the processing device (e.g., the processor 117) sets rollback data to a new rollback value, where the new rollback value indicates that the currently-selected data unit (identified by the selection data after operation 1504) is not dirty (e.g., the memory transaction has not been committed with respect to the set of physical memory locations).

Figure 16:
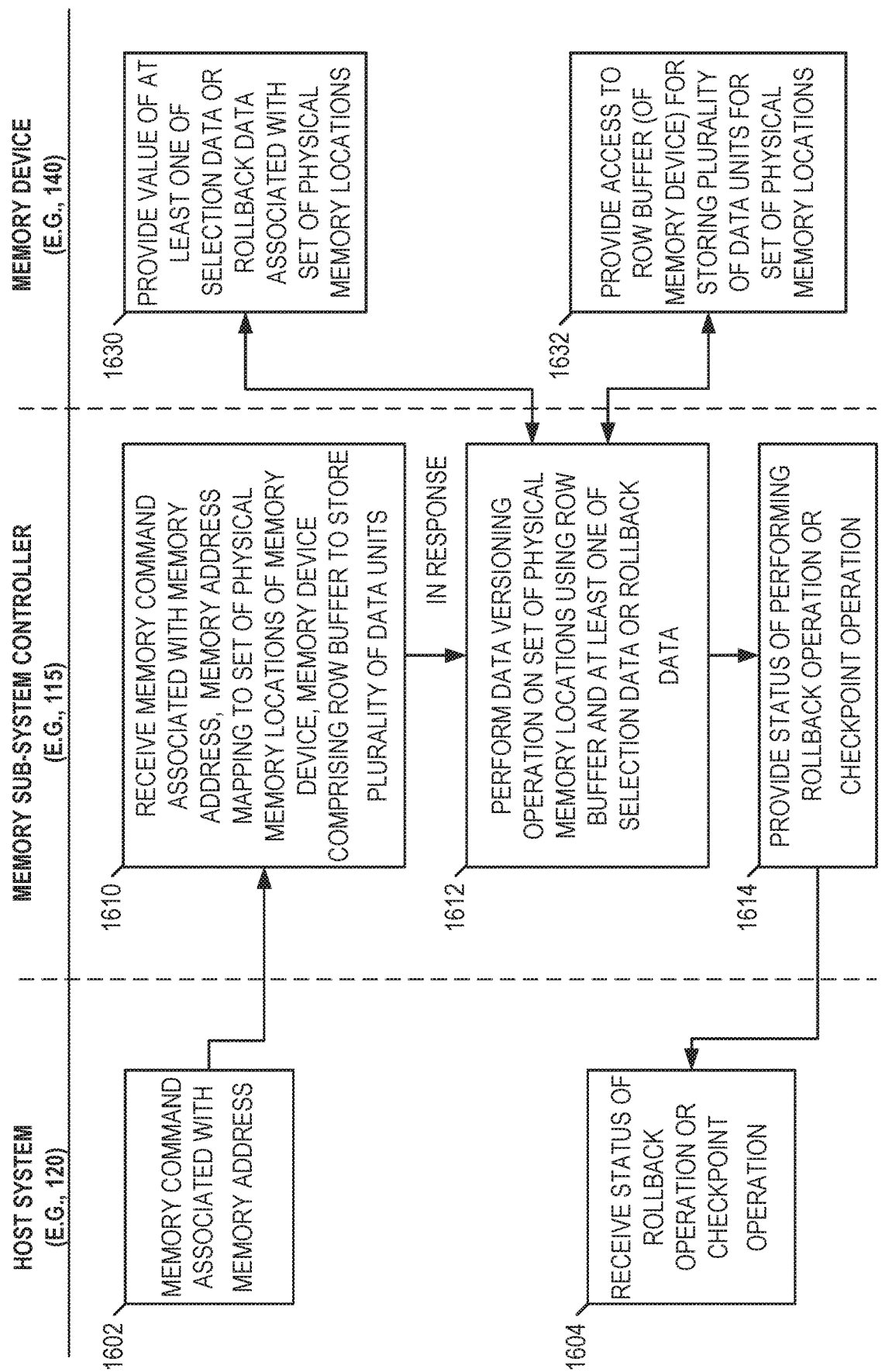
FIG. 16 provides an interaction diagram illustrating interactions between components of a computing environment in the context of some embodiments in which a method that uses versioning of stored data on a memory device as described herein is performed.

FIG. 16 provides an interaction diagram illustrating interactions between components of a computing environment in the context of some embodiments in which a method that uses versioning of stored data on a memory device as described herein is performed. The operations of the method can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method is performed by a host system (e.g., 120), a memory sub-system controller (e.g., 115), a memory device (e.g., 130 or 140), or some combination thereof. Although the operations are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are used in every embodiment. In the context of the example illustrated in FIG. 16, the host system can include the host system 120, the memory sub-system controller can include the memory sub-system controller 115, and the memory device can include the memory device 140.

As shown in FIG. 16, at operation 1602, the host system 120 sends a memory command to the memory sub-system 110 in association with a memory address. At operation 1610, the memory sub-system controller 115 receives the memory command associated with the memory address from the host system 120, where the memory address maps to a set of physical memory locations of the memory device 140, and where the memory device 140 comprises a row buffer configured to store a plurality of data units (e.g., cache lines) for the set of physical memory locations.

In response to the memory command received at operation 1610, the memory sub-system controller 115 performs a data versioning operation, such as a rollback operation or a checkpoint operation, on the set of physical memory locations at operation 1612, where the rollback operation or the checkpoint operation is performed using the row buffer and at least one of selection data or rollback data associated with the set of physical memory locations.

At operation 1630, the memory device 140 provides the memory sub-system controller 115 with a value of at least one of the selection data or the rollback data associated with the set of physical memory locations. Additionally, at operation 1632, the memory device 140 provides the memory sub-system controller 115 with access to the row buffer of the memory device 140, which stores the plurality of data units for the set of physical memory locations.

The memory sub-system controller 115, at operation 1614, provides a status (e.g., success or failure) of the rollback operation or the checkpoint operation performed by operation 1612. At operation 1604, the host system 120 receives the status of the rollback operation or the checkpoint operation from the memory sub-system controller 115.

Figure 17:
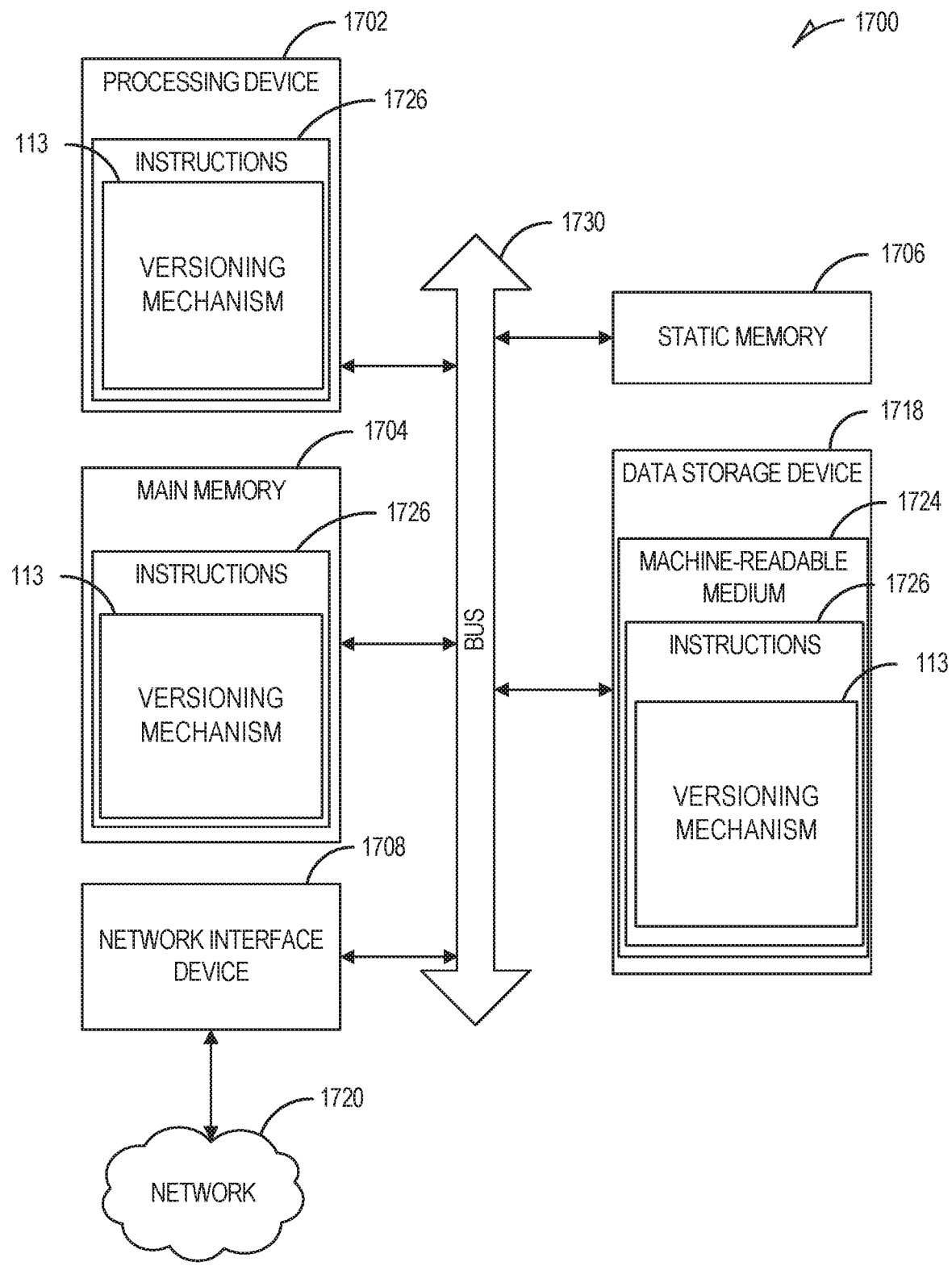
FIG. 17 is a block diagram of an example computer system in which embodiments of the present disclosure may operate.

FIG. 17 illustrates an example machine in the form of a computer system 1700 within which a set of instructions can be executed for causing the machine to perform any one or more of the methodologies discussed herein. In some embodiments, the computer system 1700 can correspond to a host system (e.g., the host system 120 of FIG. 1) that includes, is coupled to, or utilizes a memory sub-system (e.g., the memory sub-system 110 of FIG. 1) or can be used to perform the operations described herein. In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1700 includes a processing device 1702, a main memory 1704 (e.g., read-only memory (ROM), flash memory, dynamic random access memory (DRAM) such as synchronous DRAM (SDRAM) or Rambus DRAM (RDRAM), etc.), a static memory 1706 (e.g., flash memory, static random access memory (SRAM), etc.), and a data storage device 1718, which communicate with each other via a bus 1730.

The processing device 1702 represents one or more general-purpose processing devices such as a microprocessor, a central processing unit, or the like. More particularly, the processing device 1702 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 1702 can also be one or more special-purpose processing devices such as an application-specific integrated circuit (ASIC), a field programmable gate array (FPGA), a digital signal processor (DSP), a network processor, or the like. The processing device 1702 is configured to execute instructions 1726 for performing the operations and steps discussed herein. The computer system 1700 can further include a network interface device 1708 to communicate over a network 1720.

The data storage device 1718 can include a machine-readable storage medium 1724 (also known as a computer-readable medium) on which is stored one or more sets of instructions 1726 or software embodying any one or more of the methodologies or functions described herein. The instructions 1726 can also reside, completely or at least partially, within the main memory 1704 and/or within the processing device 1702 during execution thereof by the computer system 1700, the main memory 1704 and the processing device 1702 also constituting machine-readable storage media. The machine-readable storage medium 1724, data storage device 1718, and/or main memory 1704 can correspond to the memory sub-system 110 of FIG. 1.

In one embodiment, the instructions 1726 include instructions to implement functionality corresponding to versioning data stored on a memory device as described herein (e.g., the versioning mechanism 113 of FIG. 1). While the machine-readable storage medium 1724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer-readable storage medium, such as, but not limited to, any type of disk including floppy disks, optical disks. CD-ROMs, and magnetic-optical disks, read-only memories (ROMs), random access memories (RAMs). EPROMs. EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device comprising a row buffer; and
a processing device, operatively coupled to the memory device, the processing device configured to perform operations comprising:
receiving, from a host system, a memory command associated with a memory address, the memory address mapping to a set of physical memory locations of the memory device, the row buffer of the memory device being configured to store a plurality of data units for the set of physical memory locations and to store selection data and rollback data, the selection data and the rollback data being read from the set of physical memory locations into the row buffer at a same time the plurality of data units is read from the set of physical memory locations into the row buffer; and
in response to receiving the memory command, performing a data versioning operation on the set of physical memory locations using the row buffer and at least one of the selection data or the rollback data, the selection data and the rollback data being associated with the set of physical memory locations, the selection data comprising a current selection value that identifies a currently-selected data unit of the plurality of data units, and the rollback data comprising a current rollback value that indicates whether the currently-selected data unit has been written to since a last time a checkpoint operation was performed on the set of physical memory locations.

2. The system of claim 1, wherein the performing the data versioning operation, on the set of physical memory locations, using the row buffer and at least one of the selection data or the rollback data comprises:
determining that performing the memory command causes performance of the checkpoint operation on the set of physical memory locations; and
in response to determining that performing the memory command causes performance of the checkpoint operation on the set of physical memory locations, setting the rollback data to a new rollback value, the new rollback value indicating that the currently-selected data unit has not been written to since the last time the checkpoint operation was performed on the set of physical memory locations.

3. The system of claim 1, wherein the performing the data versioning operation, on the set of physical memory locations, using the row buffer and at least one of the selection data or the rollback data, comprises:
  determining that performing the memory command causes performance of a rollback operation on the set of physical memory locations; and
  in response to determining that performing the memory command causes performance of the rollback operation on the set of physical memory locations:
    determining, based on a current rollback value of the rollback data, that the currently-selected data unit has been written to since the last time the checkpoint operation was performed on the set of physical memory locations; and
    in response to determining that the currently-selected data unit has been written to since the last time the checkpoint operation was performed on the set of physical memory locations:
      setting the selection data to identify a different data unit of the plurality of data units as the currently-selected data unit; and
      setting the rollback data to a new rollback value, the new rollback value indicating that the currently-selected data unit has not been written to since the last time the checkpoint operation was performed on the set of physical memory locations.

4. The system of claim 1, wherein each data unit of the plurality of data units comprises a cache line of data.

5. The system of claim 1, wherein the plurality of data units comprises a first data unit and a second data unit, wherein the selection data comprises a selection bit, and wherein the selection bit identifies one of the first data unit or the second data unit.

6. The system of claim 1, wherein at least one of the selection data and the rollback data are stored in reserved data storage space on the memory device.

7. The system of claim 1, wherein the performing the data versioning operation, on the set of physical memory locations, using the row buffer and at least one of the selection data or the rollback data comprises:
  causing stored data to be read from the set of physical memory locations to the row buffer, the stored data comprising the plurality of data units and at least one of the selection data or the rollback data.

8. The system of claim 1, wherein the operations further comprise:
  performing a refresh operation on the set of physical memory locations, the refresh operation comprising performing the checkpoint operation on the set of physical memory locations.

9. A method comprising:
  receiving, from a host system and at a memory sub-system controller of a memory sub-system, a first memory command to write host data to a memory address, the memory address mapping to a set of physical memory locations of a memory device of the memory sub-system, and a row buffer of the memory device being configured to store a plurality of data units for the set of physical memory locations and to store selection data and rollback data, the selection data and the rollback data being read from the set of physical memory locations into the row buffer at a same time the plurality of data units is read from the set of physical memory locations into the row buffer; and
  in response to receiving the first memory command:
    reading a current rollback value of the rollback data associated with the set of physical memory locations;
    determining, based on the current rollback value, that a currently-selected data unit of the plurality of data units has not been written to since a last time a checkpoint operation was performed on the set of physical memory locations, the currently-selected data unit being identified by a current selection value of the selection data, the selection data being associated with the set of physical memory locations; and
    writing the host data to the row buffer based on the determining that the currently-selected data unit has not been written to since the last time the checkpoint operation was performed on the set of physical memory locations.

10. The method of claim 9, wherein the writing the host data to the row buffer based on the determining that the currently-selected data unit has not been written to since the last time the checkpoint operation was performed on the set of physical memory locations comprises:
  writing the host data to the row buffer at a location corresponding to a different data unit of the plurality of data units;
  setting the selection data to identify the different data unit as the currently-selected data unit; and
  setting the rollback data to a new rollback value, the new rollback value indicating that the currently-selected data unit has been written to since the last time the checkpoint operation was performed on the set of physical memory locations.

11. The method of claim 9, further comprising:
  receiving, at the memory sub-system controller, a second memory command to read requested data from the memory address, and the second memory command being received from the host system; and
  in response to receiving the second memory command:
    reading the requested data from a location on the row buffer corresponding to the currently-selected data unit; and
    providing the requested data to the host system.

12. The method of claim 9, wherein each data unit of the plurality of data units comprises a cache line of data.

13. The method of claim 9, wherein the plurality of data units comprises a first data unit and a second data unit, wherein the selection data comprises a selection bit, and wherein the selection bit identifies one of the first data unit or the second data unit.

14. At least one non-transitory machine-readable storage medium comprising instructions that, when executed by a processing device, cause the processing device to perform operations comprising:
  receiving, from a host system, a first memory command to read requested data from a memory address, the first memory command indicating that the first memory command is part of a memory transaction associated with the memory address, the memory address mapping to a set of physical memory locations of a memory device, and a row buffer of the memory device being configured to store a plurality of data units for the set of physical memory locations and to store selection data and rollback data, the selection data and the rollback data being read from the set of physical memory locations into the row buffer at a same time the plurality of data units is read from the set of physical memory locations into the row buffer; and in response to receiving the first memory command:
reading a current rollback value of the rollback data associated with the set of physical memory locations;
determining, based on the current rollback value, that a currently-selected data unit of the plurality of data units is dirty, the currently-selected data unit being identified by a current selection value of the selection data, the selection data being associated with the set of physical memory locations; and
reading the requested data from the row buffer based on the determining that the currently-selected data unit is dirty.

15. The at least one non-transitory machine-readable storage medium of claim 14, wherein the reading the requested data from the row buffer based on the determining that the currently-selected data unit is dirty comprises:
reading the requested data from a location on the row buffer corresponding to a different data unit of the plurality of data units; and
providing the requested data to the host system.

16. The at least one non-transitory machine-readable storage medium of claim 14, wherein the operations further comprise:
receiving, from the host system, a second memory command to write host data to the memory address, the second memory command indicating that the second memory command is part of the memory transaction, and the second memory command comprising a first requester identifier value; and
in response to receiving the second memory command:
reading the current rollback value of the rollback data;
determining, based on the current rollback value, that the currently-selected data unit is dirty; and
in response to determining that the currently-selected data unit is dirty:
determining that the rollback data was set to the current rollback value in association with the first requester identifier value; and
in response to determining that the rollback data was set to the current rollback value by the first requester identifier value, writing the host data to the row buffer at a location corresponding to the currently-selected data unit.

17. The at least one non-transitory machine-readable storage medium of claim 14, wherein the operations further comprise:
receiving, from the host system, a second memory command to write host data to the memory address, the second memory command indicating that the second memory command is part of the memory transaction, and the second memory command comprising a first requester identifier value; and
in response to receiving the second memory command:
reading the current rollback value of the rollback data;
determining, based on the current rollback value, that the currently-selected data unit is dirty; and
in response to determining that the currently-selected data unit is dirty:
determining that the rollback data was not set to the current rollback value in association with the first requester identifier value; and
in response to determining that the rollback data was not set to the current rollback value by the first requester identifier value, causing a conflict error to be issued to the host system in response to the second memory command.

18. The at least one non-transitory machine-readable storage medium of claim 14, wherein the operations further comprise:
receiving, from the host system, a second memory command to perform a commit of the memory transaction for at least the memory address; and
in response to receiving the second memory command, setting the rollback data to a new rollback value, the new rollback value indicating that the currently-selected data unit is not dirty.

19. The at least one non-transitory machine-readable storage medium of claim 14, wherein the operations further comprise:
detecting for a failure of the memory transaction on the set of physical memory locations prior to a commit of the memory transaction on the set of physical memory locations; and
in response to detecting the failure of the memory transaction on the set of physical memory locations prior to the commit of the memory transaction on the set of physical memory locations:
setting the selection data to identify a different data unit of the plurality of data units as the currently-selected data unit; and
setting the rollback data to a new rollback value, the new rollback value indicating that the currently-selected data unit is not dirty.

20. The at least one non-transitory machine-readable storage medium of claim 14, wherein each data unit of the plurality of data units comprises a cache line of data.

* * * * *